United States Patent
Kato

(10) Patent No.: US 10,496,465 B2
(45) Date of Patent: *Dec. 3, 2019

(54) SYSTEM OPERATIONS MANAGEMENT APPARATUS, SYSTEM OPERATIONS MANAGEMENT METHOD AND PROGRAM STORAGE MEDIUM

(71) Applicant: Kiyoshi Kato, Tokyo (JP)

(72) Inventor: Kiyoshi Kato, Tokyo (JP)

(73) Assignee: NEC CORPORATION, Tokyo (JP)

(*) Notice: Subject to any disclaimer, the term of this patent is extended or adjusted under 35 U.S.C. 154(b) by 44 days.

This patent is subject to a terminal disclaimer.

(21) Appl. No.: 15/166,485

(22) Filed: May 27, 2016

(65) Prior Publication Data

US 2016/0274965 A1 Sep. 22, 2016

Related U.S. Application Data

(63) Continuation of application No. 14/589,255, filed on Jan. 5, 2015, now Pat. No. 9,384,079, which is a
(Continued)

(30) Foreign Application Priority Data

Oct. 15, 2009 (JP) .................................. 2009-238747

(51) Int. Cl.
*G06F 11/07* (2006.01)
*G06Q 10/02* (2012.01)
*G06F 11/34* (2006.01)

(52) U.S. Cl.
CPC ........ *G06F 11/079* (2013.01); *G06F 11/0709* (2013.01); *G06F 11/0751* (2013.01);
(Continued)

(58) Field of Classification Search
None
See application file for complete search history.

(56) References Cited

U.S. PATENT DOCUMENTS 5,528,516 A * 6/1996 Yemini ............... G06F 11/2257
702/119
5,661,668 A 8/1997 Yemini et al. ................ 702/186
(Continued)

FOREIGN PATENT DOCUMENTS

JP 10-74188 A 3/1998
JP 10-224990 A 8/1998
(Continued)

OTHER PUBLICATIONS

Extended European Search Report of EP Application No. 10823495.6 dated Jul. 9, 2015.
(Continued)

*Primary Examiner* — Yolanda L Wilson

(57) ABSTRACT

In a system operations management apparatus, a burden to a system administrator when providing a decision criterion in detection of a failure in the future is reduced. The system operations management apparatus 1 includes a performance information accumulation unit 12, a model generation unit 30 and an analysis unit 31. The performance information accumulation unit 12 stores performance information including a plurality of types of performance values in a system in time series. The model generation unit 30 generates a correlation model including one or more correlations between the different types of performance values stored in the performance information accumulation unit 12 for each of a plurality of periods having one of a plurality of attributes. The analysis unit 31 performs abnormality detection of the performance information of the system which has been inputted by using the inputted performance information and the correlation model corresponding to the attribute of a period in which the inputted performance information has been acquired.

12 Claims, 26 Drawing Sheets

Related U.S. Application Data continuation of application No. 13/133,718, filed as application No. PCT/JP2010/068527 on Oct. 13, 2010, now Pat. No. 8,959,401.

(52) U.S. Cl.
CPC ...... *G06F 11/0787* (2013.01); *G06F 11/3452* (2013.01); *G06Q 10/02* (2013.01)

(56) References Cited

U.S. PATENT DOCUMENTS

| | | | |
|---|---|---|---|
| 7,237,023 B2* | 6/2007 | Menard | G06Q 30/06 709/223 |
| 7,802,144 B2 | 9/2010 | Vinberg et al. | 714/37 |
| 8,024,613 B2 | 9/2011 | Ochi et al. | 714/30 |
| 8,095,830 B1* | 1/2012 | Cohen | G06F 11/0784 714/45 |
| 8,392,760 B2 | 3/2013 | Kandula et al. | 714/26 |
| 8,479,057 B2 | 7/2013 | Poletto et al. | 714/47.3 |
| 2003/0139905 A1* | 7/2003 | Helsper | G06F 11/3006 702/182 |
| 2004/0093193 A1* | 5/2004 | Osborn | G05B 23/0267 703/2 |
| 2006/0294439 A1 | 12/2006 | Rolla et al. | 714/47 |
| 2007/0005296 A1 | 1/2007 | Beresniewicz et al. | |
| 2008/0270851 A1 | 10/2008 | Ochi et al. | |
| 2009/0031176 A1 | 1/2009 | Ide et al. | 714/47 |
| 2009/0171718 A1* | 7/2009 | Barlow | G06Q 10/0633 705/7.27 |
| 2009/0216624 A1 | 8/2009 | Kato | |
| 2009/0217099 A1 | 8/2009 | Kato | |
| 2009/0292954 A1 | 11/2009 | Jiang et al. | 714/47 |
| 2009/0313508 A1 | 12/2009 | Yan et al. | 714/47 |
| 2010/0100775 A1 | 4/2010 | Slutsman et al. | 714/47 |

FOREIGN PATENT DOCUMENTS

| | | |
|---|---|---|
| JP | 2001014295 A | 1/2001 |
| JP | 2001-142746 A | 5/2001 |
| JP | 2004062741 A | 2/2004 |
| JP | 2004-86896 A | 3/2004 |
| JP | 2004-86897 A | 3/2004 |
| JP | 2005257416 A | 9/2005 |
| JP | 2005316808 A | 11/2005 |
| JP | 2006024017 A | 1/2006 |
| JP | 2006146668 A | 6/2006 |
| JP | 2006-221310 A | 8/2006 |
| JP | 2007293393 A | 11/2007 |
| JP | 2008204040 A | 9/2008 |
| JP | 2009199533 A | 9/2009 |
| JP | 2009199534 A | 9/2009 |

OTHER PUBLICATIONS

Japanese Office Action for JP2011-536206 dated Dec. 4, 2012.
Japanese Office Action for JP Application No. 2013-168691 dated Feb. 4, 2014 with English Translation.
International Search Report for PCT/JP2010/068527 dated Jan. 11, 2011.

\* cited by examiner

Fig.2

| PRIORITY | ATTRIBUTE 1 | ATTRIBUTE 2 | ATTRIBUTE 3 | ... |
|---|---|---|---|---|
| 1 | EVERY WEEK | SATURDAY & SUNDAY | — | ... |
| 2 | EVERY DAY | — | — | ... |
| ... | ... | ... | ... | ... |

| PRIORITY | ATTRIBUTE 1 | ATTRIBUTE 2 | ATTRIBUTE 3 | ... |
|---|---|---|---|---|
| 1 | EVERY MONTH | THE LAST DAY | WEEKDAY | ... |
| 2 | EVERY WEEK | SATURDAY & SUNDAY | — | ... |
| 3 | EVERY DAY | — | — | ... |
| ... | ... | ... | ... | ... |

| TIME | A.CPU | A.MEM | ... | B.CPU | ... |
|---|---|---|---|---|---|
| ... | ... | ... | ... | ... | ... |
| 2007/10/05 17:25 | 12 | 80 | ... | 33 | ... |
| 2007/10/05 17:26 | 15 | 79 | ... | 32 | ... |
| 2007/10/05 17:27 | 34 | 51 | ... | 32 | ... |
| 2007/10/05 17:28 | 63 | 51 | ... | 35 | ... |
| 2007/10/05 17:29 | 20 | 81 | ... | 50 | ... |
| 2007/10/05 17:30 | 10 | 78 | ... | 51 | ... |
| 2007/10/05 17:31 | 11 | 79 | ... | 34 | ... |
| ... | ... | ... | ... | ... | ... |
| 2007/11/07 8:30 | 20 | 79 | ... | 90 | ... |

| INPUT (X) | OUTPUT (Y) | α | β | ... | WEIGHT | ... |
|---|---|---|---|---|---|---|
| A.CPU | A.MEM | −0.6 | 100 | ... | 0.88 | ... |
| ... | ... | ... | ... | ... | ... | ... |
| C.CPU | C.MEM | −0.3 | 100 | ... | 0.63 | ... |
| B.MEM | C.MEM | 2 | −10 | ... | 0.51 | ... |
| ... | ... | ... | ... | ... | ... | ... |

17A

SYSTEM OPERATIONS MANAGEMENT APPARATUS, SYSTEM OPERATIONS MANAGEMENT METHOD AND PROGRAM STORAGE MEDIUM

CROSS-REFERENCE TO RELATED APPLICATIONS

The present application is a continuation application of U.S. patent application Ser. No. 14/589,255, filed on Jan. 5, 2015, which is a continuation application of U.S. patent application Ser. No. 13/133,718 filed on Jun. 9, 2011, which is a National Stage Entry of International Application PCT/JP2010/068527, filed on Oct. 13, 2010, which claims the benefit of priority from Japanese Patent Application 2009-238747 filed on Oct. 15, 2009, the disclosures of all of which are incorporated in their entirety by reference herein.

TECHNICAL FIELD

The present invention relates to a system operations management apparatus, a system operations management method and a program storage medium, and, more particularly, to a system operations management apparatus, a system operations management method and a program storage medium which determine a system operating status of a managed system.

BACKGROUND ART

In offering services targeting customers, in recent years, there exist a lot of services using a computer system and information and communication technology such as mail-order selling using the internet. In order to carry out such services smoothly, it is requested that the computer system always operates stably. Therefore, operations management of the computer system is indispensable.

However, operations management of such system has been performed manually by a system administrator. Therefore, there is a problem that, along with increase in scale and complexity of the system, sophisticated knowledge and experience are required for the system administrator, and the system administrator or the like who does not have such knowledge and experience sufficiently may cause wrong operations.

In order to avoid such problem, a system operations management apparatus which performs unified monitoring of a status of the hardware that composes a system and controlling thereof has been provided. This system operations management apparatus acquires data representing an operating status of the hardware of the managed system (hereinafter, referred to as performance information) online, and determines presence of a failure on the managed system from a result of analysis of the performance information and shows its content to a display unit (for example, a monitor) which is an element included in the system operations management apparatus. Here, as an example of a method to determine presence of the failure mentioned above, there are a technique to perform determination based on a threshold value for the performance information in advance and a technique to perform determination based on a reference range for a difference between an actual measurement value of the performance information and a calculated value (theoretical value) of the performance information calculated in advance.

In this system operations management apparatus, information about presence or absence of the failure on the system is shown on the display unit such as the monitor as mentioned above. Therefore, when presence of the failure is shown, the cause of the failure needs to be narrowed down from the shown content to whether the cause of the failure is lack of the memory capacity or whether it is overload of a CPU (Central Processing Unit) in order to improve the failure. However, because such narrowing-down work of the cause of the failure requires an investigation of system histories and parameters of portions which seem to be related to occurrence of the failure, the work needs to depend on the experience and sense of the system administrator who performs the work. Therefore, a high skill will be required inevitably for the system administrator who operates the system operations management apparatus. At the same time, solving the system failure through operation of the system operations management system forces the system administrator to bear heavy time and physical burden.

Accordingly, in this system operations management apparatus, it is important to perform analysis of a combination of abnormal statuses or the like automatically based on information of processing capacities collected from the managed system, inform the system administrator of a summarized point of a problem and a cause of the failure which are estimated roughly, and then receive an instruction for handling thereof.

Thus, there are various related technologies regarding the system operations management apparatus equipped with functions to reduce the burden of the system administrator who performs management of the system and repair work of the failure. Hereinafter, those related technologies will be described.

The technology disclosed in Japanese Patent Application Laid-Open No. 2004-062741 is a technology related to a failure information display apparatus which indicates failure information of a system. This technology makes it possible to recognize the location of a failure visually and easily, simplifies estimation of the origin of the failure, and thus reduces a burden of a system administrator, by showing a failure message according to the order of occurrence of the failure and actual arrangement of a faulty unit to outside, when any failure is found in management of an operating status of the managed data processing system.

The technology disclosed in Japanese Patent Application Laid-Open No. 2005-257416 is a technology related to an apparatus which diagnoses a measured device based on time series information on parameters acquired from the measured device. The technology detects a failure caused by performance deterioration of the measured device appropriately by calculating strength of a correlation between information of parameters based on variations of time series information of the parameters. According to this technology, it can be judged appropriately whether time series variations of information on different parameters are similar or not.

The technology disclosed in Japanese Patent Application Laid-Open No. 2006-024017 is a technology related to a system for estimating the capacity of a computer resource. The technology identifies an amount of a load caused by specific processing and analyzes the load associated with an amount of processing in the future by comparing a history of processing of system elements and a history of changes in performance information. According to this technology, when relation between the processing and the load has been grasped in advance, the behavior of a system can be identified.

Technology disclosed in Japanese Patent Application Laid-Open No. 2006-146668 is a technology related to an operations management support apparatus. This technology acquires information on an operating status of hardware such as a CPU and information on access volume to a web control server from a managed system in a regular time interval, finds a correlation between a plurality of elements which compose the information, and determines whether the current status of the system is normal or not from the correlation. According to this technology, a situation of performance degradation of the system can be detected more flexibly while the cause of the degradation and measures thereto can be shown in detail.

The technology disclosed in Japanese Patent Application Laid-Open No. 2007-293393 is a technology related to a fault monitoring system which searches similar failures in the past. By acquiring information related to various kinds of processing capacity periodically and indicating the information on a time axis along with information related to a failure which occurred in the past, the technology can predict occurrence of a failure in the future based on whether it is similar to analysis information at the time of occurrence of the failure in the past.

The technology disclosed in Japanese Patent Application Laid-Open No. H10-074188 is a technology related to a data learning device. The technology compares information of a learning object acquired from a data managed apparatus and information related to an estimated value generated in advance, and determines that the acquired information is exceptional information when the similarity degree between them is smaller than or equal to a predetermined criterion. Further, the technology corrects the content of the information related to the estimated value based on a difference between them. According to this technology, processing accuracy of data managed apparatus can be improved by repeating such operation.

SUMMARY OF INVENTION

Technical Problem

However, in the technologies disclosed in each of the above patent documents, there have been problems which will be mentioned below.

First, in the technology disclosed in Japanese Patent Application Laid-Open No. 2004-062741, although handling of the system failure which has occurred actually is performed accurately and easily, there is a problem that the system failure which may happen in the future is not prevented. Therefore, there is a problem that the prevention of the system failure in the future still remains as work with a heavy burden for the system administrator having less experience.

Next, in the technology disclosed in Japanese Patent Application Laid-Open No. 2005-257416, the structure and the behavior of the target system need to be understood correctly in advance in order to identify the failure which has occurred actually from the number and the content of the correlations which have collapsed. That is, it is necessary to figure out in advance that what kind of the correlation collapse causes what kind of the failure. For this reason, there is a problem that a system administrator is required to have great experience and knowledge and is forced a heavy burden when this technology is implemented.

Next, in the technology disclosed in Japanese Patent Application Laid-Open No. 2006-024017, when a system of a prediction object is large in scale, or it has a structure to cooperate with other systems, the relation between processing and a load becomes very complicated, so that the history of all processing which can be related has to be collected and analyzed in order to estimate the amount of the load correctly.

In order to perform a correct prediction in such analysis, a load of the data collection and the analysis is large, thus there is a problem that a person who is involved in the analysis is forced a heavy burden. Also, there is a problem that the person who is involved in the analysis needs to have a very high level of knowledge.

Next, in the technology disclosed in Japanese Patent Application Laid-Open No. 2006-146668, although clarification of the cause of and an improvement action to a system abnormality which has occurred actually are performed in a appropriate manner, a system administrator or the like has to perform prediction of occurrence of the system abnormality in the future by himself based on a determination result of normality of the current status of the system. Therefore, there is a problem that the system administrator is required to have great experience and is forced a heavy burden.

Next, in the technology disclosed in Japanese Patent Application Laid-Open No. 2007-293393, when the content of information on an analysis object is information which continues in time series without distinction between normal and abnormality, it cannot be figured out clearly only from its values and changing status that which part is the failure. Therefore, in such case, there is a problem that a system administrator or the like has to detect a faulty part based on his own experience and thus the system administrator is forced a heavy burden.

Next, in the technology disclosed in Japanese Patent Application Laid-Open No. H10-074188, the system administrator himself needs to create the information concerning the estimated value mentioned above. Because great experience is required for such creation, there is a problem that the system administrator is forced a heavy burden.

As stated above, in each of the conventional related technologies, skill and experience beyond a certain level is required for a system administrator, and also a burden forced to the system administrator or the like is heavy.

Further, because there is a tendency of increase in the level and complexity of the content of a managed system in these days, it is expected that a burden which a system administrator is forced will also increase further in the future.

Object of Invention

The object of the present invention is to provide a system operations management apparatus, a system operations management method and a program storage medium which solve the above-mentioned problems and can reduce a burden to a system administrator when providing a decision criterion in detection of a fault in the future.

Solution to Problem

A system operations management apparatus according to an exemplary aspect of the invention includes a performance information accumulation means for storing performance information including a plurality of types of performance values in a system in time series, a model generation means for generating a correlation model which includes one or more correlations between different ones of said types of performance values stored in said performance information accumulation means for each of a plurality of periods that has one of a plurality of attributes, and an analysis means for performing abnormality detection of said performance information of said system which has been inputted by using said inputted performance information and said correlation model corresponding to said attribute of a period in which said inputted performance information has been acquired.

A system operations management method according to an exemplary aspect of the invention includes storing performance information including a plurality of types of a performance values in a system in time series, generating a correlation model which includes one or more correlations between different ones of said plurality of types of performance values for each of a plurality of periods that has one of a plurality of attributes, and performing abnormality detection of said performance information of said system which has been inputted by using said inputted performance information and said correlation model corresponding to said attribute of a period in which said inputted performance information has been acquired.

A program recording medium recording thereon a system operations management program, causing computer to perform a method, according to an exemplary aspect of the invention includes storing performance information including a plurality of types of a performance values in a system in time series, generating a correlation model which includes one or more correlations between different ones of said plurality of types of performance values for each of a plurality of periods that has one of a plurality of attributes, and performing abnormality detection of said performance information of said system which has been inputted by using said inputted performance information and said correlation model corresponding to said attribute of a period in which said inputted performance information has been acquired.

Advantageous Effects of Invention

The effect of the present invention is to reduce a burden to a system administrator substantially when providing a criterion in detection of a fault in the future in a system operations management apparatus.

BRIEF DESCRIPTION OF DRAWINGS

FIG. 2 An explanatory drawing showing an example of schedule information in the first exemplary embodiment of the present invention.

FIG. 4 An explanatory drawing showing yet another example of schedule information in the first exemplary embodiment of the present invention.

FIG. 22 An explanatory drawing showing an example of a status that the performance information shown in FIG. 21 has been stored in a manner being accumulated.

FIG. 23 An explanatory drawing showing an example of a correlation model of the system operations management apparatus shown in FIG. 20.

DESCRIPTION OF EMBODIMENTS

Hereinafter, each exemplary embodiment of a system operations management apparatus according to the present invention will be described based on FIGS. 1 to 26.

[System Operations Management Apparatus which is the Premise of the Present Invention]

First, a system operations management apparatus 101 which is the premise of the present invention will be described based on FIGS. 20 to 25 before the description of a first exemplary embodiment.

Figure 20:
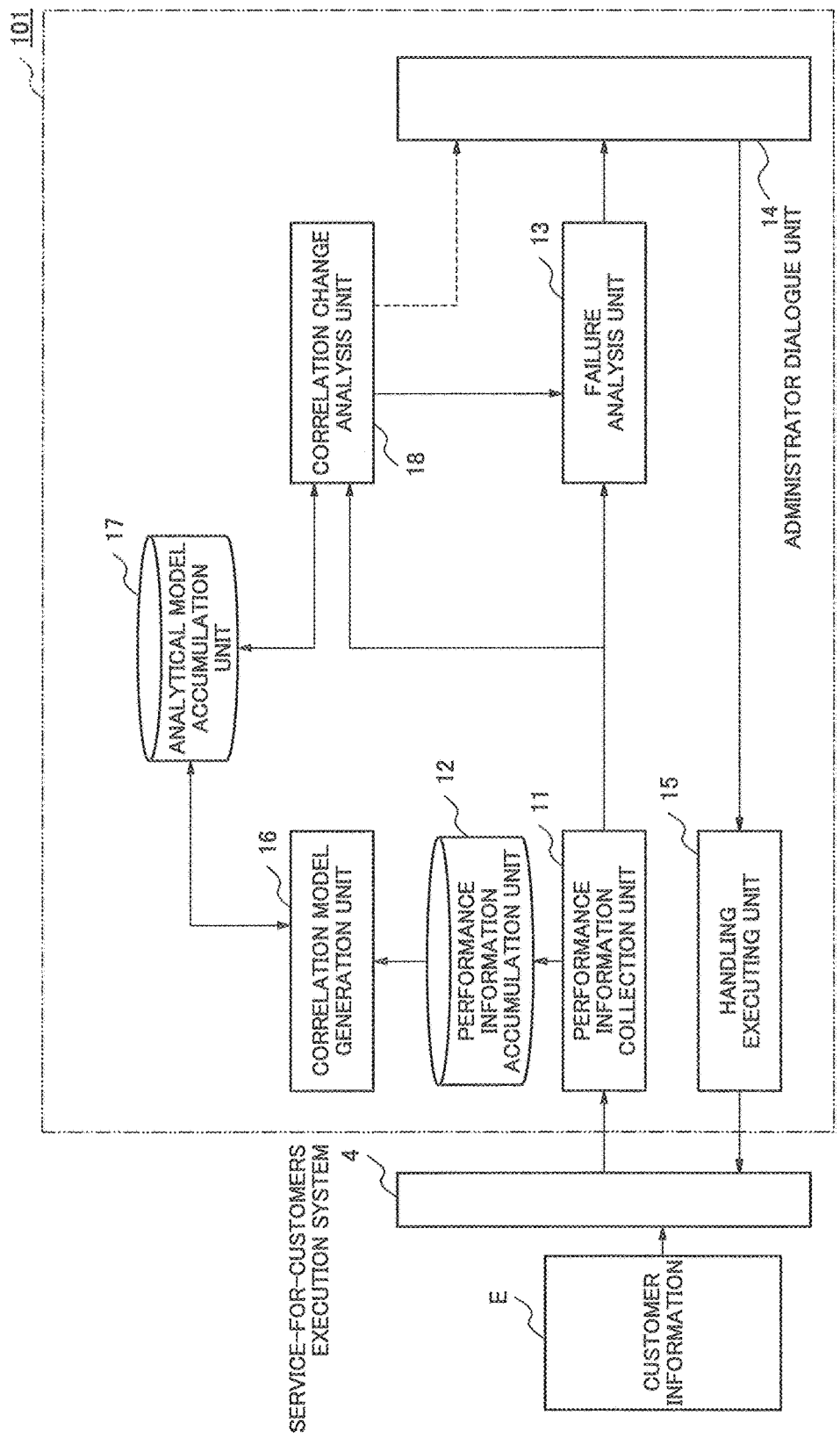
FIG. 20 A block diagram showing a structure which is the premise of a system operations management apparatus according to the present invention.

FIG. 20 is a block diagram showing a structure which is the premise of the system operations management apparatus according to the present invention.

In FIG. 20, the system operations management apparatus 101 manages an operating status of a service-for-customers execution system 4. The service-for-customers execution system 4 receives information E which is requested by a customer through an electric telecommunication line and carries out a service of providing the above-mentioned information to the customer.

The service-for-customers execution system 4 includes one or more servers. The service-for-customers execution system 4 is configured as a computer which is independent from the system operations management apparatus 101.

As shown in FIG. 20, the system operations management apparatus 101 includes a performance information collection unit 11 and a performance information accumulation unit 12. Here, the performance information collection unit 11 acquires performance information of a server included in the service-for-customers execution system 4 periodically from the server. The performance information accumulation unit 12 stores performance information acquired by the performance information collection unit 11 sequentially. As a result, the performance information of the server included in the service-for-customers execution system 4 can be stored with time.

Here, the performance information of the server is information including a plurality types of performance values obtained by quantifying a status of each of various elements (a CPU and a memory, for example) which have influence on the operation of the server that is included in the service-for-customers execution system 4. As specific examples of the performance value, there are a CPU utilization rate and a remaining memory capacity.

Figure 21:
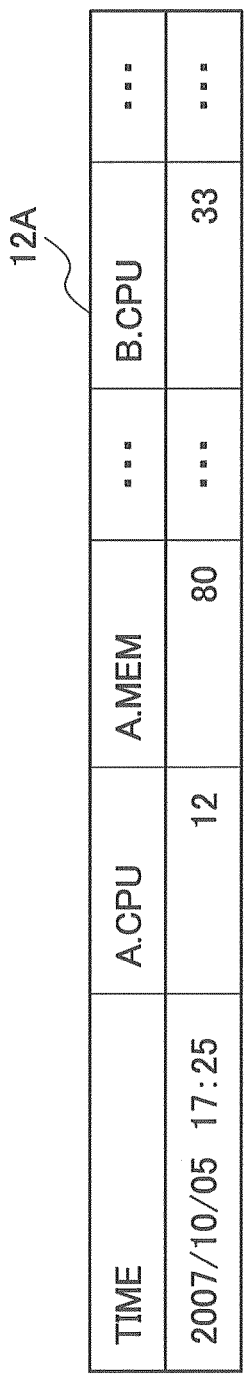
FIG. 21 An explanatory drawing showing an example of performance information of the system operations management apparatus shown in FIG. 20.

FIG. 21 is an explanatory drawing showing an example of the performance information of the system operations management apparatus shown in FIG. 20. FIG. 22 is an explanatory drawing showing an example of a status that the performance information shown in FIG. 21 has been stored in a manner being accumulated.

For example, the performance information collection unit 11 acquires the performance information such as FIG. 21, and the performance information accumulation unit 12 stores the performance information as shown in FIG. 22.

As shown in FIG. 20, the system operations management apparatus 101 includes a correlation model generation unit 16, an analytical model accumulation unit 17 and a correlation change analysis unit 18. The correlation model generation unit 16 generates a correlation model of the operating status of the service-for-customers execution system 4. The analytical model accumulation unit 17 stores the correlation model generated by the correlation model generation unit 16. The correlation change analysis unit 18 determines whether the difference between an actual measurement value of the performance value included in the performance information and a value calculated by a transform function of the correlation model stored in the analytical model accumulation unit 17 is within a reference range set in advance or not and outputs the result of the determination. By this, the operating status of the service-for-customers execution system 4 can be checked. Here, the correlation model generation unit 16 generates the correlation model by taking out time-series data of the performance information for a predetermined period stored in the performance information accumulation unit 12, and deriving the transform function between any two types of the performance values of the performance information based on this time-series data.

Moreover, as shown in FIG. 20, the system operations management apparatus 101 includes a failure analysis unit 13, an administrator dialogue unit 14 and a handling executing unit 15. The failure analysis unit 13 analyzes presence or absence of a possibility of a system failure for the service-for-customers execution system 4 based on a result of analysis of the performance information by the correlation change analysis unit 18. When the failure analysis unit 13 determines that there is a possibility of a system failure, the administrator dialogue unit 14 indicates the determination result to outside, and, when an improvement order for the system failure is inputted from outside in response to the indicated content, the administrator dialogue unit 14 accepts the inputted information. When the improvement order is inputted to the administrator dialogue unit 14, the handling executing unit 15 receives information concerning this input and carries out processing for coping with the system failure on the server included in the service-for-customers execution system 4 according to the content of the information concerning the input.

As a result, abnormality of the performance information on the server included in the service-for-customers execution system 4 can be detected correctly and handled in a appropriate manner.

Next, each component of the system operations management apparatus 101 will be explained in detail.

The performance information collection unit 11 accesses the server of the service-for-customers execution system 4 periodically and acquires performance information thereof. The acquired performance information is stored in the performance information accumulation unit 12. In the exemplary embodiment of the present invention, the performance information collection unit 11 acquires the performance information periodically and stores it in the performance information accumulation unit 12 sequentially.

Next, the performance information accumulation unit 12 stores the performance information acquired by the performance information collection unit 11. As mentioned above, the performance information is stored in the performance information accumulation unit 12 periodically and sequentially.

Next, the correlation model generation unit 16 receives the performance information stored in the performance information accumulation unit 12 corresponding to an acquisition period set in advance, selects any two types of such performance information, and derives a transform function (hereinafter, a correlation function) for converting from time series of a performance value of one type into time series of a performance value of the other type.

The correlation model generation unit 16 derives the correlation functions mentioned above for all combinations of the types, and as a result, generates a correlation model by combining each of the obtained correlation functions.

Moreover, after generating the correlation model mentioned above, the correlation model generation unit 16 stores this correlation model in the analytical model accumulation unit 17.

The analytical model accumulation unit 17 stores the correlation model received from the correlation model generation unit 16.

Next, the correlation change analysis unit 18 substitutes a performance value of one type into the aforementioned correlation function so that obtains a theoretical value (calculated value) of the performance value of the other type, and compares an actual value (actual measurement value) of the performance value therewith, for performance information acquired newly for analyses by the performance information collection unit 11. Then, by determining whether the difference between the both values is within a reference range set in advance, analysis of whether the correlation between the performance values of the two types is maintained or not (hereinafter, correlation change analysis) is performed.

The correlation change analysis unit 18 determines that the correlation between the performance values of the two types is maintained normally when the above-mentioned difference is within the reference range. By this analysis result, the operating status of the system, that is, the servers included in the service-for-customers execution system 4, at the time of the acquisition of processing capacity therefrom can be confirmed.

After that, the correlation change analysis unit 18 sends the analysis result to the failure analysis unit 13.

Next, the failure analysis unit 13 determines whether there is a possibility of a failure on the servers included in the service-for-customers execution system 4 based on the analysis result received from the correlation change analysis unit 18 and a method set in advance, and sends the result of the determination to the administrator dialogue unit 14.

Here, the following are examples of a technique for the above-mentioned determination.

In a first example, the failure analysis unit 13 confirms whether the number of the correlations determined as abnormal in the results of the correlation change analysis of the performance information exceeds a value set in advance or not, and, when exceeding, it is determined that there is a possibility of a failure in the service-for-customers execution system 4.

In a second example, only when the number of the correlations related to a specific element (a CPU utilization rate, for example) among the correlations determined as abnormal is grater than or equal to a threshold value set in advance, it is determined that there is a possibility of a failure in the service-for-customers execution system 4.

Next, the administrator dialogue unit 14 outputs the content of the determination result concerning whether there is a possibility of a failure or not, received from the failure analysis unit 13, to outside for indication through an output unit which is not illustrated (a monitor equipped in the administrator dialogue unit 14, for example).

Figure 25:
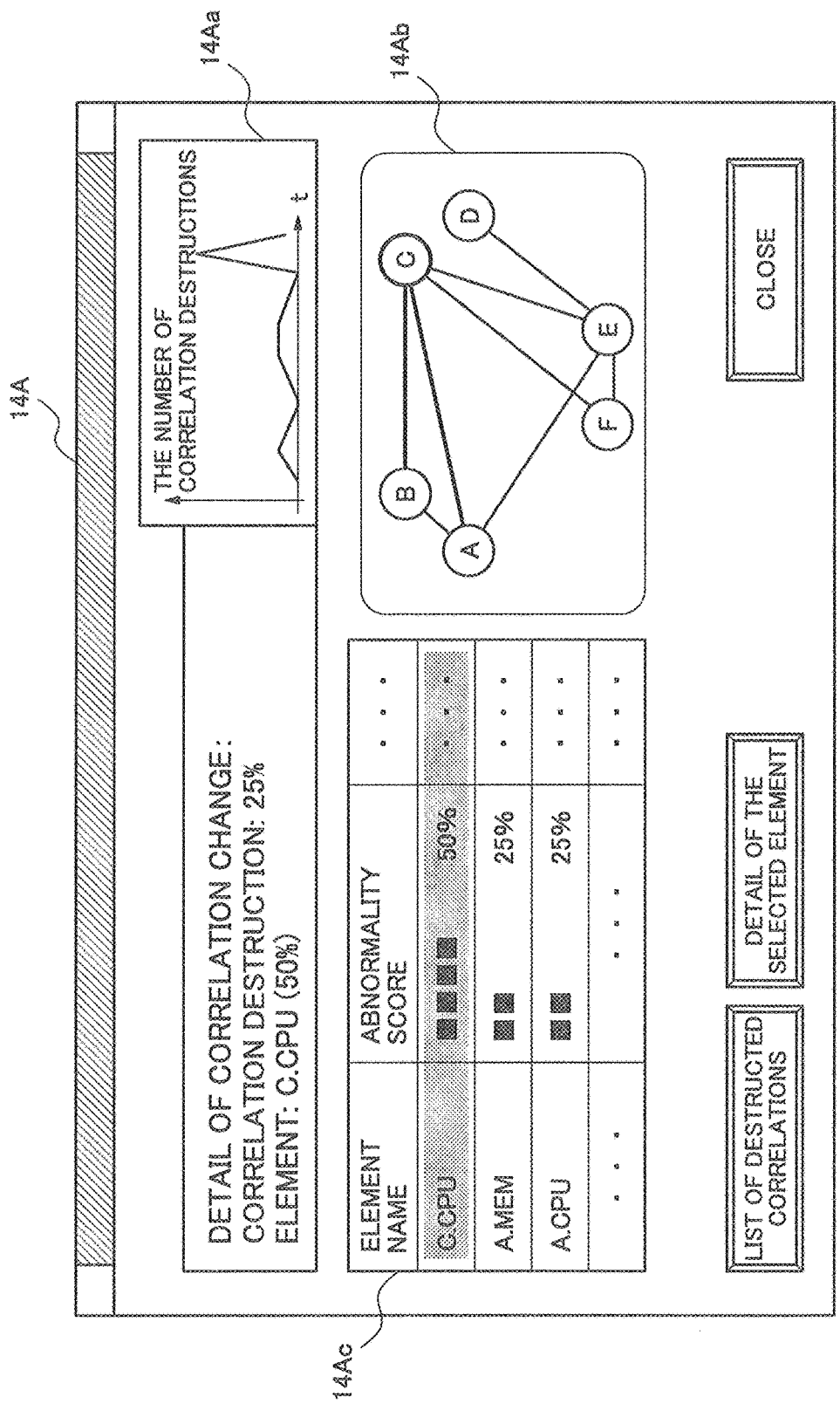
FIG. 25 An explanatory drawing showing an example of content displayed on the administrator dialogue unit 14 of the system operations management apparatus shown in FIG. 20.

FIG. 25 is an explanatory drawing showing an example of content displayed on the administrator dialogue unit 14 of the system operations management apparatus 101 shown in FIG. 20.

For example, the administrator dialogue unit 14 displays the above-mentioned determination result on a display screen 14A in FIG. 25. As shown in the display screen 14A, the administrator dialogue unit 14 performs displaying using charts so that a system administrator can understand the determination result easily.

The screen display 14A will be described further. The display screen 14A includes the number of correlation destruction cases 14Aa which indicates a degree of abnormality of the performance information analysis result, a correlation chart 14Ab which indicates an abnormality point and a list of elements with a large abnormality degree 14Ac. These displays enable the system administrator to be informed accurately that there is a possibility of a failure in C.CPU when the abnormality degree of the C.CPU is large as shown in FIG. 25, for example.

After displaying the determination result of failure analysis (display screen 14A in FIG. 25), the administrator dialogue unit 14 receives an input of an improvement order against the failure from the system administrator who has confirmed the content of the display and sends information thereof to the handling executing unit 15.

Next, the handling executing unit 15 implements measures which is based on the failure improvement order inputted to the administrator dialogue unit 14 on the servers of the service-for-customers execution system 4.

For example, when an order to reduce the amount of work is inputted from the administrator dialogue unit 14 in case a load of a specific CPU becomes high, the handling executing unit 15 implements measures to reduce the work amount on the servers of the service-for-customers execution system 4.

[Generation of Correlation Model]

Here, generation of a correlation model by the correlation model generation unit 16 mentioned above will be described more specifically.

The correlation model generation unit 16 takes out, among pieces of performance information stored in the performance information accumulation unit 12, ones which have been acquired in a given period set in advance from outside.

Next, the correlation model generation unit 16 selects any two types of performance information.

Here, it is supposed that the correlation model generation unit 16 has selected "A.CPU" (the usage rate of the A.CPU) and "A.MEM" (the remaining amount of the A.MEM) among types of the performance information 12B in FIG. 22, and the description will be continued.

The correlation model generation unit 16 calculates a correlation function F which converts time series of a performance value of "A.CPU" (input X) into time series of a performance value of "A.MEM" (output Y).

Here, according to the exemplary embodiment of the present invention, the correlation model generation unit 16 can select a suitable one from functions of various forms as the content of the correlation function F. Here, it is supposed that a function of the form "$Y=\alpha X+\beta$" has been selected as the correlation function F, and the description will be continued.

The correlation model generation unit 16 compares the time series variation of the performance value of "A.MEM" X and the time series variation of the performance value of "A.MEM" Y in the performance information 12B and calculates numerical values $\alpha$ and $\beta$ of the formula "$Y=\alpha X+\beta$" that can convert X into Y. Here, it is supposed that "−0.6" and "100" have been calculated as $\alpha$ and $\beta$, respectively, as a result of the calculation.

Moreover, the correlation model generation unit 16 compares time series of numerical values of Y which are obtained by converting X with the above-mentioned correlation function "$Y=-0.6X+100$" and the time series of numerical values of actual Y and calculates weight information w of this correlation function from a conversion error which is a difference between them.

The correlation model generation unit 16 carries out the above mentioned operation for all combinations of two types of the performance information 12B. When the performance information 12B includes performance values of five types, for example, the correlation model generation unit 16 generates the correlation function F for each of twenty combinations obtained from these five types.

Here, the correlation function F becomes a criterion to check stability of the service-for-customers execution system 4 that is a management object, therefore it is created based on the performance information which has been acquired during a period when the service-for-customers execution system 4 is stable (in normal times).

The correlation model generation unit 16 generates a correlation model by combining various correlation functions obtained in this way into one.

FIG. 23 is an explanatory drawing showing an example of the correlation model of the system operations management apparatus shown in FIG. 20.

A correlation model 17A shown in this FIG. 23 includes a plurality of correlation functions corresponding to combinations of two types.

[Correlation Change Analysis]

Next, correlation change analysis by the correlation change analysis unit 18 mentioned above will be described more specifically.

Here, the description will be done on the premise that the performance information collection unit 11 has acquired performance information 12Ba indicated in the last line of the 12B of FIG. 22 (the performance information acquired at 8:30 on Nov. 7, 2007) as the performance information for the analysis.

When the performance information 12Ba is received from the performance information collection unit 11, the correlation change analysis unit 18 accesses the analytical model accumulation unit 17 to take out a correlation model stored therein and extracts one correlation function suited for the analysis of the performance information 12Ba from the correlation functions included in the correlation model.

Specifically, the correlation change analysis unit 18 extracts the correlation functions for all combinations of the types in the performance information 12Ba. For example, when there are three types, "A.CPU", "A.MEM" and "B.CPU", in the performance information 12Ba, the correlation change analysis unit 18 selects and extracts all correlation functions for the combinations "A.CPU" and "A.MEM", "A.MEM" and "B.CPU", and "A.CPU" and "B.CPU" regarding "X" and "Y" mentioned above.

Henceforth, the description will be continued for the case the combination of types "A.CPU" and "A.MEM" is extracted and the correlation change analysis is carried out based thereon.

The correlation change analysis unit 18 substitutes the actual measurement of "A.CPU" for X of the above-mentioned correlation function to calculate a numerical value of Y for the performance information 12Ba. Then, the correlation change analysis unit 18 compares the numerical value of Y that has been calculated (that is, the theoretical value of "A.MEM") and an actual numerical value of "A.MEM" of the performance information (the actual measurement).

When it is confirmed that the difference between the theoretical value of "A.MEM" and the actual measurement of "A.MEM" is within a reference range set in advance as a result of the comparison, the correlation change analysis unit 18 determines that the correlation between the two types "A.CPU" and "A.MEM" of the performance information 12Ba is maintained (that is, it is normal).

On the other hand, when it is confirmed that the difference mentioned above is out of the reference range, the correlation change analysis unit 18 determines that the correlation between the two types "A.CPU" and "A.MEM" of the performance information 12Ba is collapsed (that is, it is abnormal).

[Operations of the System Operations Management Apparatus in FIG. 20]

Next, operations of the system operations management apparatus 101 will be described below based on FIG. 24.

Figure 24:
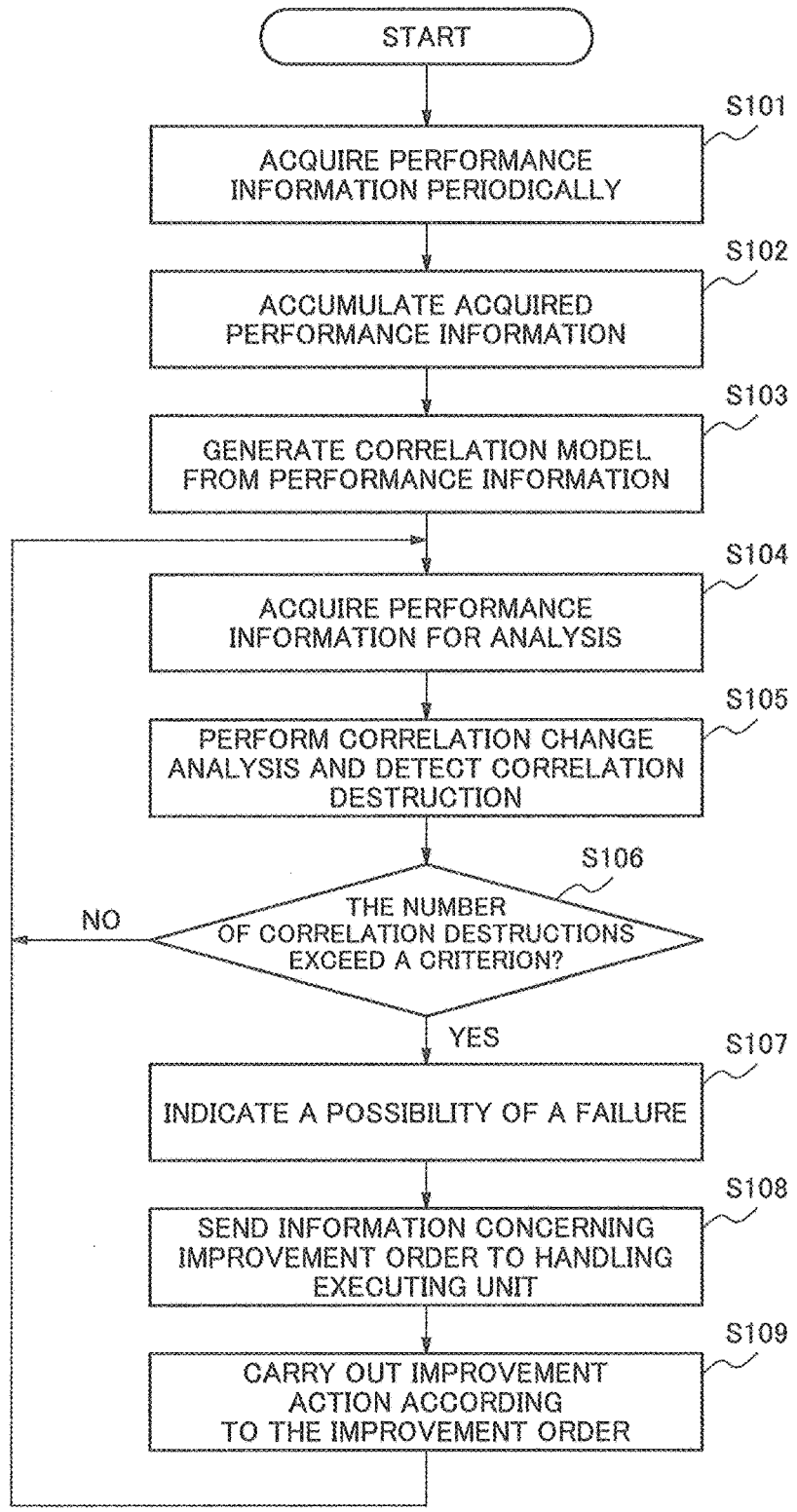
FIG. 24 A flow chart showing an operation of the system operations management apparatus shown in FIG. 20.

FIG. 24 is a flow chart showing the operations of the system operations management apparatus shown in FIG. 20.

The performance information collection unit 11 acquires performance information periodically from the service-for-customers execution unit 4 (Step S101) and stores it in the performance information accumulation unit 12 (Step S102).

Next, the correlation model generation unit 16 takes out pieces of performance information for the period set in advance among pieces of performance information stored in the performance information accumulation unit 12, and generates a correlation model based thereon (Step S103). The correlation model generated here is stored in the analytical model accumulation unit 17.

Next, the correlation change analysis unit 18 acquires performance information which is an analysis object from the performance information collection unit 11 (Step S104). At the same time, the correlation change analysis unit 18 obtains a correlation model used for the correlation change analysis from the analytical model accumulation unit 17.

Next, the correlation change analysis unit 18 performs the correlation change analysis for the performance information for analyses and detects correlation destruction (Step S105).

After completion of the correlation change analysis, the correlation change analysis unit 18 sends the result of the analysis to the failure analysis unit 13.

The failure analysis unit 13 that has received the result of the analysis confirms the number of correlations that have been determined as being collapsed correlations (the number of the correlation destruction cases) in the result of the analysis, and confirms whether the number exceeds a criterion set in advance (Step S106). When it exceeds the criterion set in advance as a result of the confirmation (Step S106/yes), the failure analysis unit 13 determines that there is a possibility of a failure in the service-for-customers execution system 4 and sends information concerning the content of the detailed analysis thereof to the administrator dialogue unit 14. On the other hand, when it does not exceed the criterion set in advance (Step S106/no), the steps starting from Step S104 which is the step of acquisition of the performance information for analysis are repeated.

The administrator dialogue unit 14 that has received the information concerning the content of the detailed analysis from the failure analysis unit 13 indicates that there is a possibility of a failure in the service-for-customers execution system 4 based on the information (Step S107).

Then, when an improvement order against the failure is inputted to the administrator dialogue unit 14 by a system administrator who has confirmed the result of the analysis indicated on the administrator dialogue unit 14, the administrator dialogue unit 14 sends information concerning the improvement order input to the handling executing unit 15 (Step S108).

Next, when the information concerning the improvement order input is received, the handling executing unit 15 carries out an improvement action on the service-for-customers execution system 4 according to the content thereof (Step S109).

After that, the steps starting from the step of the acquisition operation of the performance information for analyses (Step S104) are repeated. By this, a change of the status of the service-for-customers execution system 4 over time can be checked.

First Exemplary Embodiment

Next, the concrete content of a first exemplary embodiment of the present invention will be described based on FIGS. 1 to 6.

Figure 1:
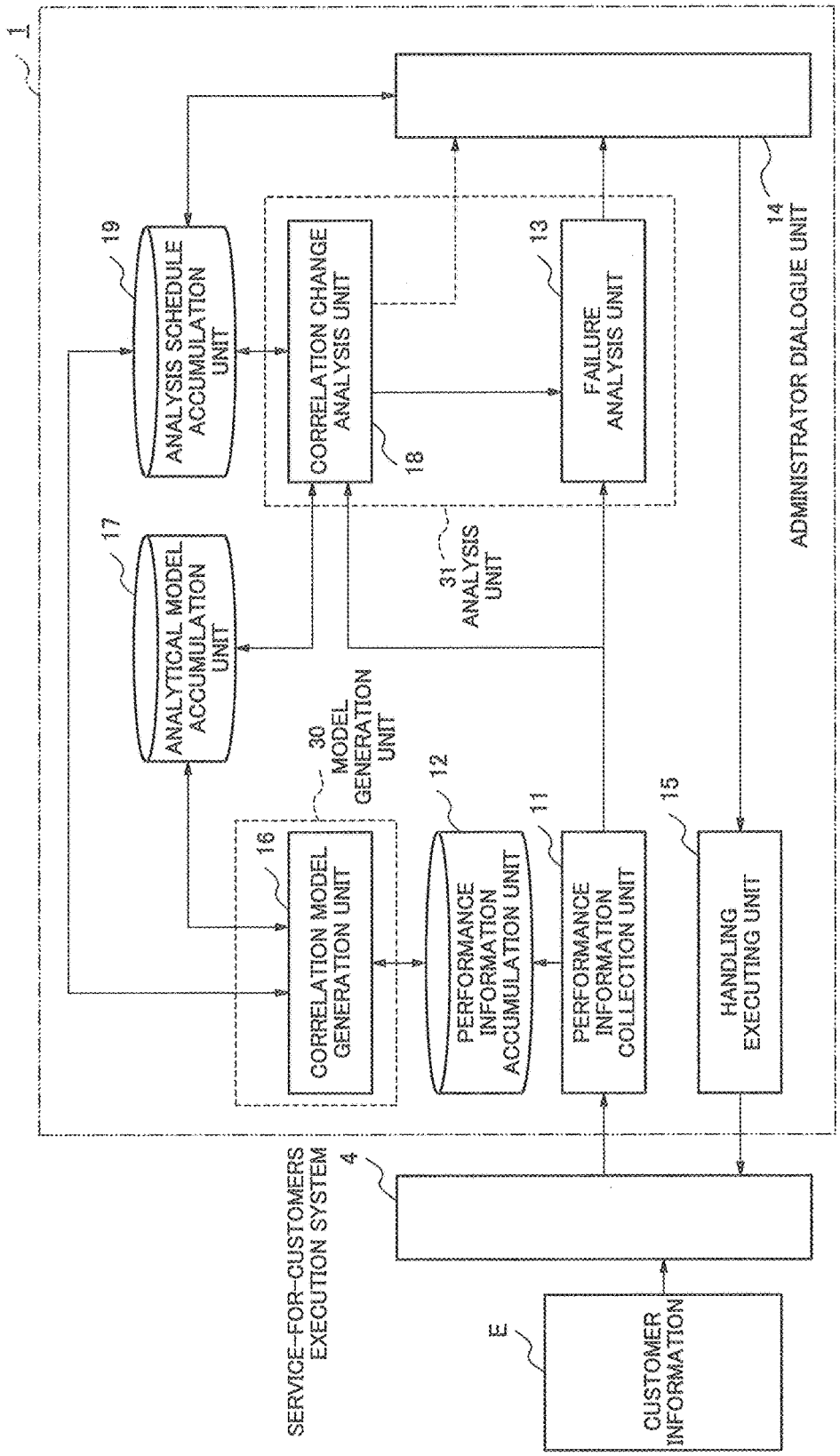
FIG. 1 A block diagram showing a structure of a first exemplary embodiment of a system operations management apparatus of the present invention.

FIG. 1 is a block diagram showing a structure of the first exemplary embodiment of a system operations management apparatus of the present invention.

Here, as shown in FIG. 1, the system operations management apparatus 1 in the first exemplary embodiment of the present invention includes, like the system operations management apparatus 101 in FIG. 20 mentioned above, a performance information collection unit 11, a performance information accumulation unit 12, a correlation model generation unit 16, an analytical model accumulation unit 17, a correlation change analysis unit 18, a failure analysis unit 13, an administrator dialogue unit 14 and a handling executing unit 15. The performance information collection unit 11 acquires performance information from the service-for-customers execution system 4. The performance information accumulation unit 12 stores the acquired performance information. The correlation model generation unit 16 generates a correlation model based on the acquired performance information. The analytical model accumulation unit 17 stores the generated correlation model. The correlation change analysis unit 18 analyzes abnormality of performance information acquired using the correlation model. The failure analysis unit 13 determines abnormality of the service-for-customers execution system 4 based on the result of analysis by the correlation change analysis unit 18. The administrator dialogue unit 14 outputs the result of the judgment by the failure analysis unit 13. When there is an input of an improvement order against the content outputted by the administrator dialogue unit 14, the handling executing unit 15 performs improvement of the service-for-customers execution system 4 based on the order.

Moreover, the system operations management apparatus 1 includes an analysis schedule accumulation unit 19. The analysis schedule accumulation unit 19 stores schedule information which is a schedule for changing the correlation model according to the acquisition period of the performance information for analyses in the correlation change analysis mentioned above. Here, this schedule information is created by a system administrator in advance.

The analysis schedule accumulation unit 19 is accessible from the correlation model generation unit 16 and the correlation change analysis unit 18. As a result, it is possible to generate a correlation model and carry out performance information analysis based on the schedule information stored in this analysis schedule accumulation unit 19.

The administrator dialogue unit 14, the correlation model generation unit 16 and the correlation change analysis unit 18 in the first exemplary embodiment of the present invention further include new functions in addition to the various functions mentioned earlier. Hereinafter, those functions will be described.

The administrator dialogue unit 14 accepts an input of the schedule information created in advance at the outside thereof and stores the inputted schedule information in the analysis schedule accumulation unit 19.

Figure 3:
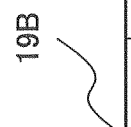
FIG. 3 An explanatory drawing showing another example of schedule information in the first exemplary embodiment of the present invention.

FIG. 2, FIG. 3 and FIG. 4 are explanatory drawings showing examples of the schedule information in the first exemplary embodiment of the present invention.

For example, in schedule information 19A in FIG. 2, a schedule of the first priority for Saturday and Sunday of every week, and a schedule of the second priority for every day are designated. This schedule information 19A is applied in order of the priority, and the analytical period is classified into two categories, such as, every Saturday and Sunday, and days of the week except them (Monday to Friday).

Similarly, in schedule information 19B in FIG. 3, only a schedule of the first priority for every day is designated.

In schedule information 19C in FIG. 4, a schedule of the first priority for the day which is the last day and a weekday of every month, a schedule of the second priority for Saturday and Sunday of every week, and a schedule of the third priority for every day are designated.

[Generation of Correlation Model]

Next, generation of a correlation model by the correlation model generation unit 16 in the first exemplary embodiment of the present invention will be described further.

When generating a correlation model, the correlation model generation unit 16 acquires pieces of performance information for a period set in advance from the performance information accumulation unit 12, and receives schedule information from the analysis schedule accumulation unit 19. Then, the correlation model generation unit 16 classifies performance information according to an analytical period set in the schedule information referring to the time of acquisition by the performance information collection unit 11 of the performance information. After that, the correlation model generation unit 16 generates a correlation model using the method mentioned above based on each of the classified performance information groups. As a result, a correlation model for each analytical period is obtained.

For example, a case in which the correlation model generation unit 16 obtains the schedule information 19A (FIG. 2) and generates a correlation model will be considered.

First, the correlation model generation unit 16 derives correlation functions based on performance information acquired by the performance information collection unit 11 in the analytical period of the first priority, that is, Saturday and Sunday, and generates a correlation model based thereon.

Next, the correlation model generation unit 16 derives correlation functions based on performance information acquired in the analytical period of the second priority, that is, Monday to Friday which is a period representing "every day" except the period of the above-mentioned first priority, and generates a correlation model based thereon.

After that, the correlation model generation unit 16 stores all of the generated correlation models for respective analytical periods in the analytical model accumulation unit 17 in association with respective analytical periods.

Meanwhile, in the first embodiment of the present invention, it is supposed that a model generation unit 30 includes the correlation model generation unit 16. Also, it is supposed that an analysis unit 31 includes the correlation change analysis unit 18 and the failure analysis unit 13.

[Correlation Change Analysis]

Next, correlation change analysis by the correlation change analysis unit 18 in the first exemplary embodiment of the present invention will be described further.

First, the correlation change analysis unit 18 receives performance information for analysis from the information collection unit 11 and takes out all of correlation models generated based on schedule information from the analytical model accumulation unit 17. Moreover, the correlation change analysis unit 18 obtains the schedule information from the analysis schedule accumulation unit 19.

Next, the correlation change analysis unit 18 confirms the time and date of acquisition of acquired performance information. As a confirmation method of the time and date of acquisition on this occasion, the correlation change analysis unit 18 may read time and date information included in the performance information (refer to the performance information 12A of FIG. 21), for example.

The correlation change analysis unit 18 confirms whether a correlation model set at present is suited for the performing correlation change analysis of the performance information acquired as an object for analysis (that is, whether the acquisition period of performance information used for generation of this correlation model is the same analytical period as the acquisition period of the performance information for analyses acquired).

As a result of the confirmation, when the correlation model is not suited for use in correlation change analysis, the correlation change analysis unit 18 extracts a correlation model suitable for the analysis from the analytical model accumulation unit 17 and changes the setting to this correlation model.

On this occasion, when a correlation model suitable for the analysis has not been generated yet, the correlation change analysis unit 18 sends information indicating that a correlation model suitable for the analysis does not exist to the correlation model generation unit 16. The correlation model generation unit 16 that has received this information performs replenishment generation of a correlation model suitable for the analysis and stores it in the analytical model accumulation unit 17. Moreover, the correlation model generation unit 16 sends information indicating that generation of a correlation model has been completed to the correlation change analysis unit 18.

Figure 5:
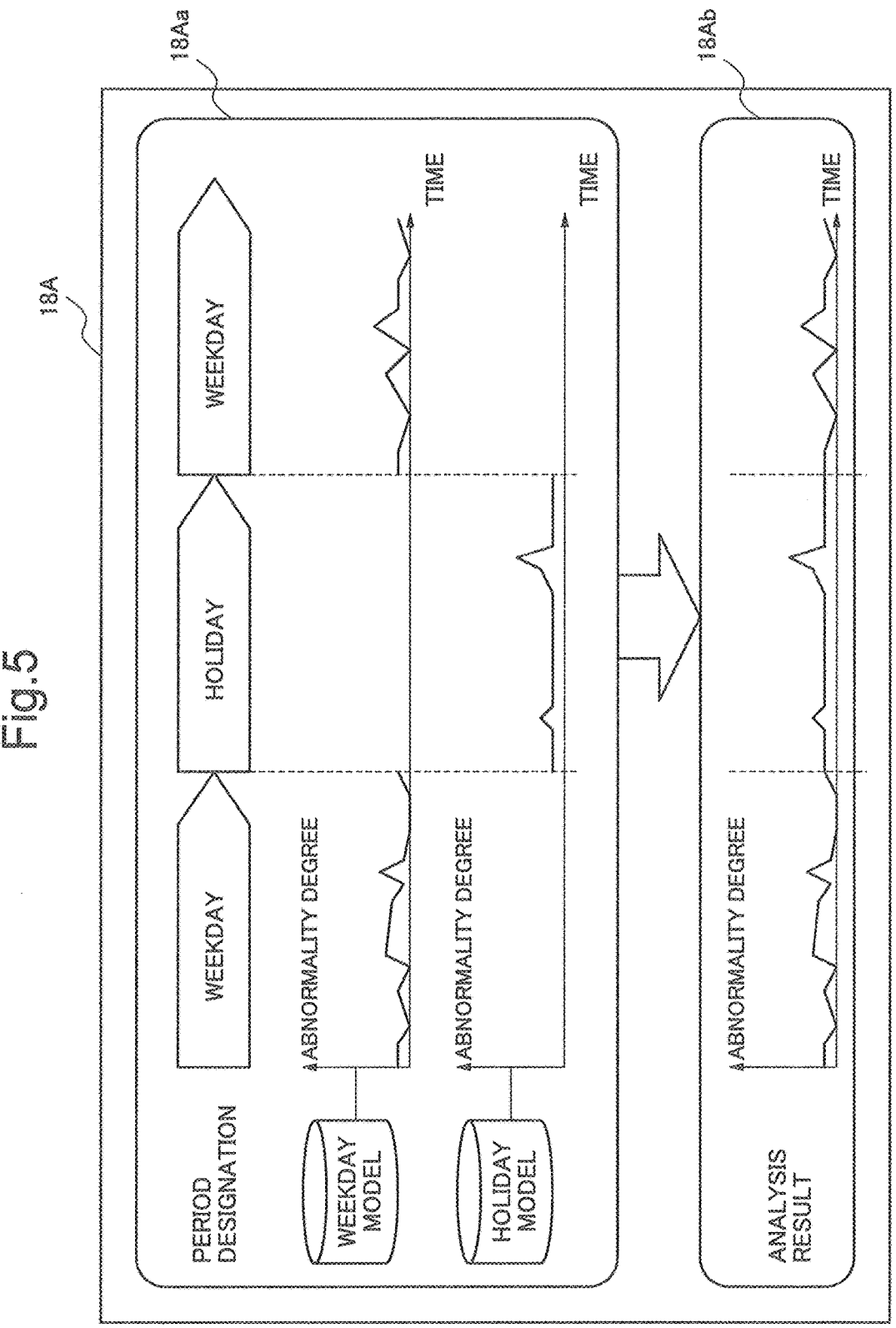
FIG. 5 An explanatory drawing showing an example of an operation for generating a correlation change analysis result in the first exemplary embodiment of the present invention.

FIG. 5 is an explanatory drawing showing an example of an operation for generating a correlation change analysis result in the first exemplary embodiment of the present invention.

As mentioned above, 18A of FIG. 5 indicates a result of analysis when determination of an analytical period change and an operation for executing analysis are carried out repeatedly. In 18Aa of FIG. 5, the analytical period is classified into a holiday (it corresponds to the schedule of the first priority of the schedule information 19A of FIG. 2) and a weekday (it corresponds to the schedule of the second priority of the schedule information 19A of FIG. 2), and analysis is performed by generating a correlation model for each of the periods. A result of analysis as shown in 18Ab of FIG. 5 is obtained by extracting these results of analysis for respective analytical periods and combining them.

In this case, by using the correlation model for weekdays on a weekday and the correlation model for holidays on a holiday, a result of analysis according to the operating characteristics of the respective periods is provided. Thus, by performing analysis while switching correlation models automatically according to schedule information designated in advance, an analysis result with a high degree of accuracy is obtained without increasing the burden of the administrator.

The other functions in each of the units are identical with those of the system operations management apparatus 101 in FIG. 20 mentioned above.

[Operations of the First Exemplary Embodiment]

Next, operations of the system operations management apparatus 1 in the first exemplary embodiment of the present invention will be described below based on FIG. 6.

Figure 6:
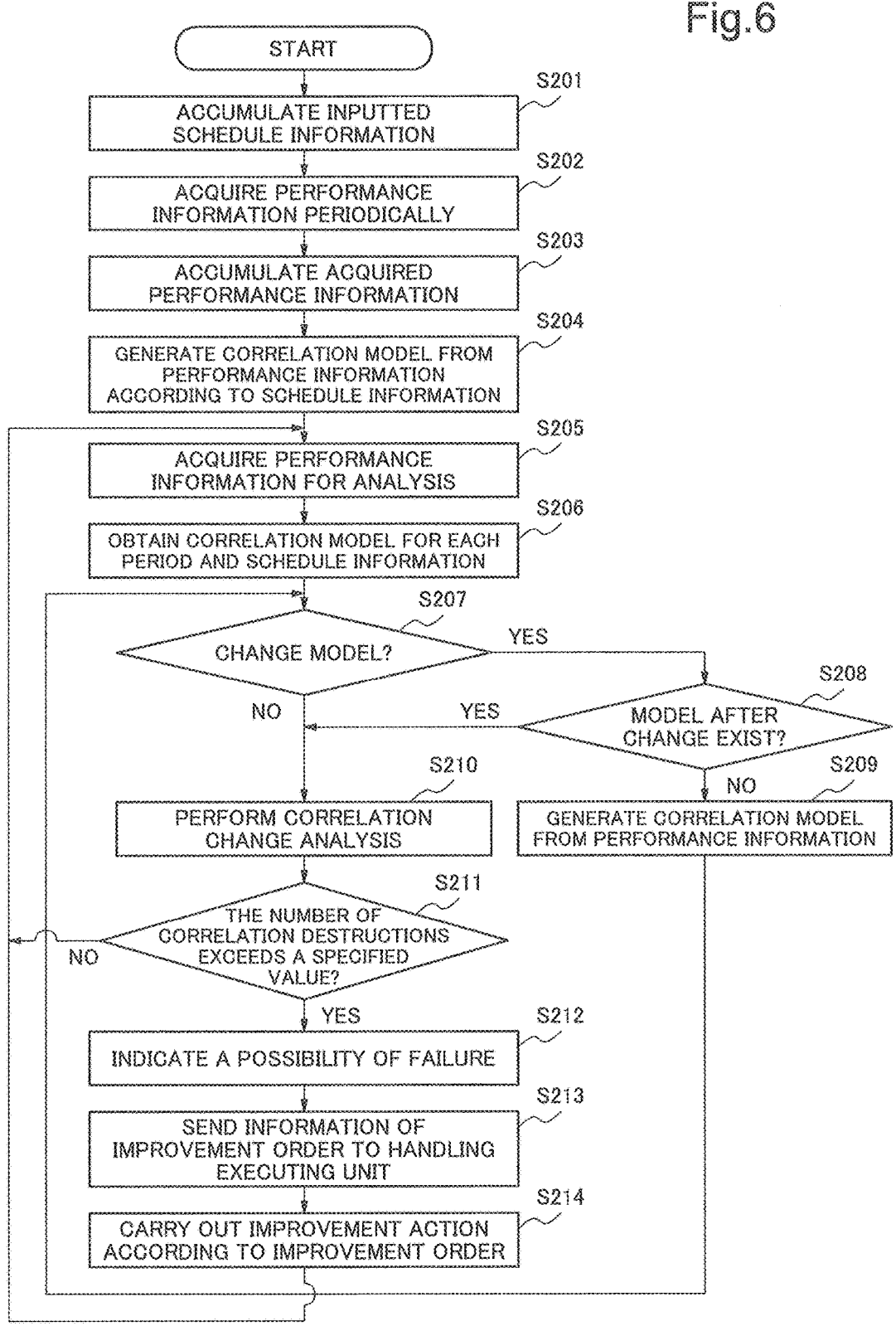
FIG. 6 A flow chart showing an operation of a system operations management apparatus in the first exemplary embodiment of the present invention.

FIG. 6 is a flow chart showing the operations of the system operations management apparatus in the first exemplary embodiment of the present invention.

Here, in order to make the flow of overall operation clear, the operations overlapping with those of the system operations management apparatus 101 in FIG. 20 mentioned above will be also referred to.

The administrator dialogue unit 14 sends schedule information inputted from outside to the analysis schedule accumulation unit 19 and stores it (Step S201, the schedule information storing step).

The performance information collection unit 11 acquires performance information periodically from a server included in the service-for-customers execution system 4 (Step S202, the performance information acquiring step), and stores it in the performance information accumulation unit 12 (Step S203, the performance information storing step).

Next, the correlation model generation unit 16 obtains performance information corresponding to a predetermined period from the performance information accumulation unit 12. Moreover, the correlation model generation unit 16 obtains analysis schedule information from the analysis schedule accumulation unit 19.

Next, the correlation model generation unit 16 generates a correlation model for each analytical period which is included in the acquired analysis schedule information (Step S204, the correlation model generation step) and stores it in the analytical model accumulation unit 17 in association with each analytical period.

Then, the correlation change analysis unit 18 acquires performance information for analysis from the performance information collection unit 11 (Step S205, the performance information for analysis acquiring step). The correlation change analysis unit 18 obtains the correlation model for each period from the analytical model accumulation unit 17 and schedule information from the analysis schedule accumulation unit 19, respectively (Step S206, the correlation model and schedule information obtaining step).

The correlation change analysis unit 18 confirms the time and date of acquisition of the performance information for analysis, and confirms whether the correlation model set at present is suited for analysis of the performance information or not, and determines whether change of a correlation model is needed or not (Step S207, the analytical period selection step).

That is, when the correlation model set at present is not suited to analysis of the performance information, the correlation change analysis unit 18 determines to change it to a correlation model suitable for the analysis. On the other hand, when a correlation model suitable for the analysis has been already set, the correlation change analysis unit 18 determines not to change the correlation model.

When determining to change the setting of a correlation model at Step S207 (Step S207/yes), the correlation analysis unit 18 confirms whether a correlation model for the analytical period after the change has been already generated or not (Step S208). When not being generated yet (Step S208/no), the correlation analysis unit 18 transmits information indicating that a correlation model for the analytical period after the change has not been generated to the correlation model generation unit 16. The correlation model generation unit 16 that has received the information performs replenishment generation of a correlation model and stores it in the analytical model accumulation unit 17 (Step S209, the correlation model replenishment generation step), and sends information indicating that replenishment generation of the correlation model after the change has been completed to the correlation change analysis unit 18.

When a correlation model after the change has been already generated (Step S208/yes), the correlation change analysis unit 18 performs the correlation change analysis of the performance information using the correlation model (Step S210, the correlation change analysis step).

When determining not to change a correlation model at Step S207 (Step S207/no), the correlation change analysis unit 18 performs the correlation change analysis using the correlation model for the analytical period set at present without change (Step S210, the correlation change analysis step).

After the end of the correlation change analysis, the correlation change analysis unit 18 sends the result of analysis to the failure analysis unit 13.

The failure analysis unit 13 that has received the result of analysis confirms whether the number of correlations determined as abnormal in the correlation change analysis result of the performance information exceeds a value specified in advance (Step S211, the failure analysis step). When exceeding as a result of the confirmation, (Step S211/yes), the failure analysis unit 13 sends information on a detailed content of abnormality in the performance information to the administrator dialogue unit 14. On the other hand, when not exceeding (Step S211/no), the steps starting from Step S205 which is the performance information for analysis acquiring step are repeated.

When information concerning the detailed content of the abnormality of the performance information is received from the failure analysis unit 13, the administrator dialogue unit 14 indicates that there is a possibility of a failure in the service-for-customers execution system 203 based on the information (Step S212, the failure information output step).

Next, when an improvement order against the above-mentioned failure of the system is inputted to the administrator dialogue unit 14 by a system administrator who has confirmed the result of analysis indicated on the administrator dialogue unit 14, the administrator dialogue unit 14 sends information of the improvement order input to the handling executing unit 15 (Step S213, the improvement order information input step).

Next, upon reception of the information of the improvement order input from the administrator dialogue unit 14, the handling executing unit 15 carries out the improvement action on the service-for-customers execution system 4 according to the content of the information (Step S214, the system improvement step).

After this, the steps starting from the acquisition operation of performance information for analyses (Step S205) are carried out repeatedly. As a result, a change in the operation status of the service-for-customers execution system 4 can be confirmed over time.

Here, the concrete content that are carried out in each step mentioned above may be programmed and be executed by a computer.

Figure 26:
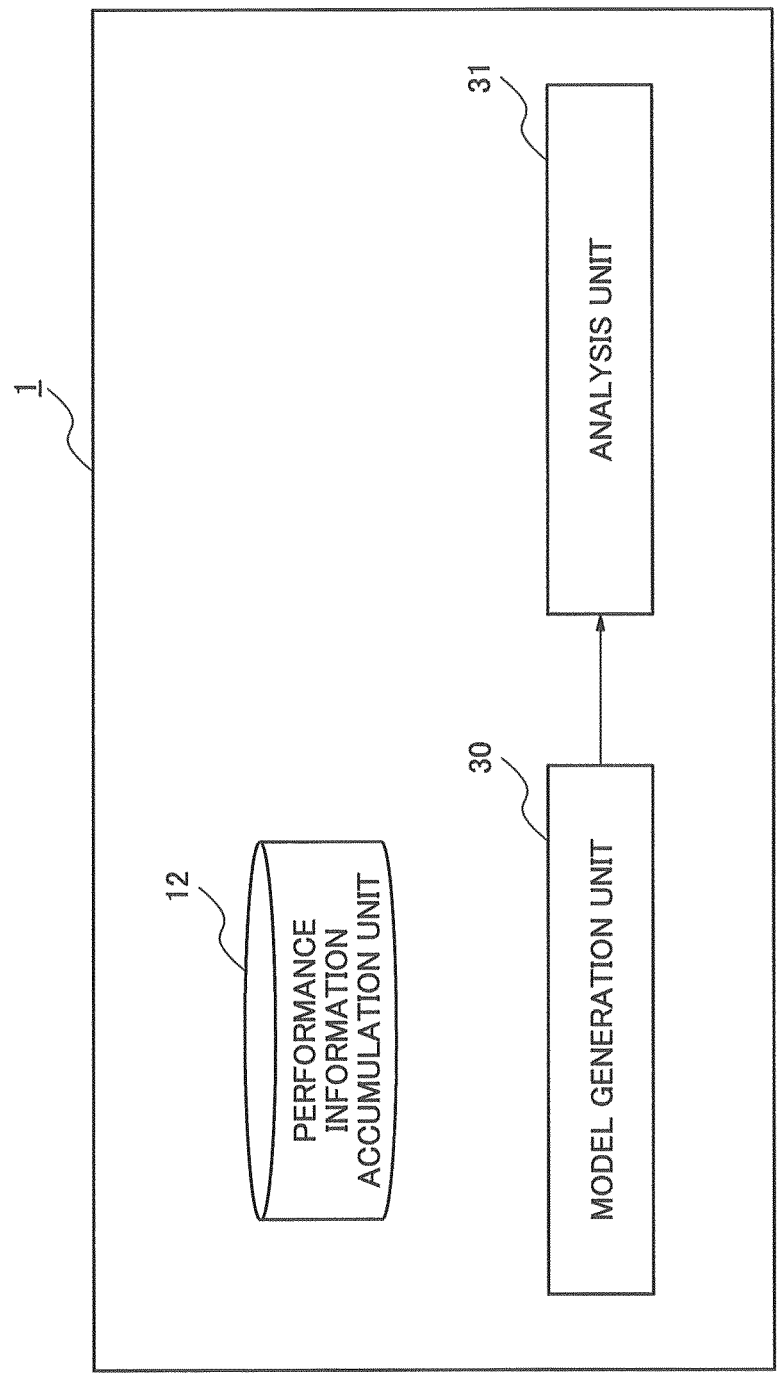
FIG. 26 A block diagram showing a characteristic structure of the first embodiment of the present invention.

Next, the characteristic structure of the first implementation of the present invention will be described. FIG. 26 is a block diagram showing the characteristic structure of the first embodiment of the present invention.

The system operations management apparatus 1 includes the performance information accumulation unit 12, the model generation unit 30 and the analysis unit 31.

Here, the performance information accumulation unit 12 stores performance information including a plurality of types of performance values in a system in time series. The model generation unit 30 generates a correlation model which includes one or more correlations between the different types of performance values stored in the performance information accumulation unit 12 for each of a plurality of periods having one of a plurality of attributes. The analysis unit 31 performs abnormality detection of the performance information of the system which has been inputted by using the inputted performance information and the correlation model corresponding to the attribute of a period in which the inputted performance information has been acquired.

[The Effect of the First Exemplary Embodiment]

According to the first exemplary embodiment of the present invention, even when the environment of the service-for-customers execution system 4 varies over time, correlation change analysis can be carried out upon selecting a suitable correlation model appropriately because it is arranged such that schedule information is introduced and the correlation change analysis is performed using a correlation model which is based on performance information acquired in the same analytical period as the time of acquisition of the performance information for analysis. As a result, operation of the service-for-customers execution system 4 can be managed with a high degree of accuracy.

Moreover, according to the first exemplary embodiment of the present invention, generation and change of a model needed according to a combination of business patterns are automated and a burden of a system administrator is reduced substantially by registering the business patterns as schedule information in advance.

Here, the present invention is not limited to this example. In the present invention, the similar effect can also be obtained using other methods which can designate change of a correlation model for an analytical period corresponding to the time and date of acquisition of performance information for analyses.

In the above-mentioned description, determination whether to change a correlation model is performed by the correlation change analysis unit 18. However, in the present invention, it is not limited to this example. The correlation model generation unit 16 may perform determination whether to change a correlation model, or either one of the correlation model generation unit 16 and the correlation change analysis unit 18 may perform determination and control the other. The correlation model generation unit 16 and the correlation change analysis unit 18 may perform determination of an analytical period jointly.

Whichever method above is adopted, the system operations management apparatus 1 which is able to change a correlation model according to the time and date of acquisition of performance information for analyses and perform analysis thereof can provide the similar effect.

Second Exemplary Embodiment

Next, a second exemplary embodiment of an operations management system according to the present invention will be described based on FIGS. 7 to 16.

Figure 7:
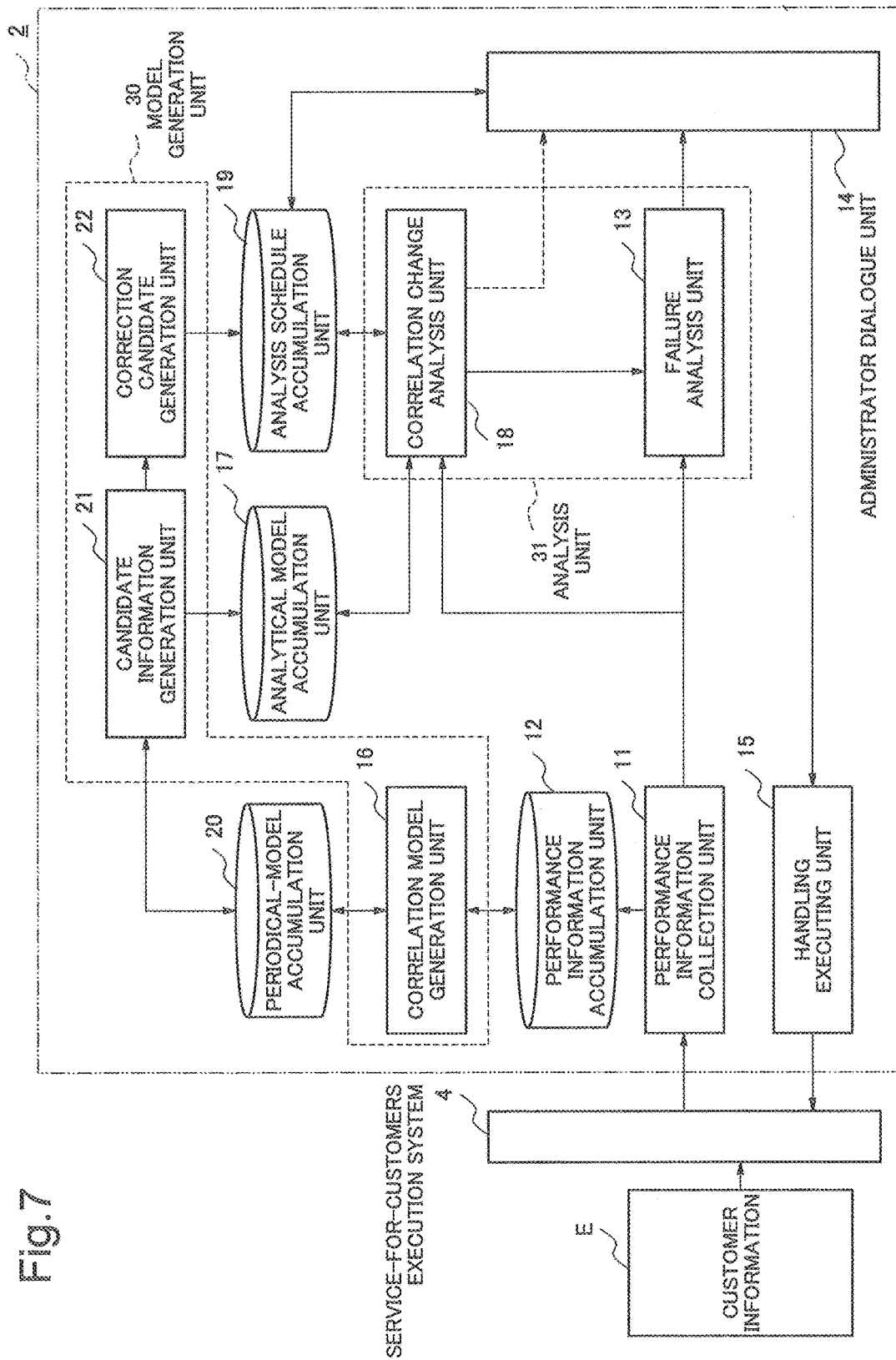
FIG. 7 A block diagram showing a structure of a second exemplary embodiment of a system operations management apparatus of the present invention.

FIG. 7 is a block diagram showing a structure of the second exemplary embodiment of a system operations management apparatus of the present invention.

As shown in FIG. 7, a system operations management apparatus 2 in the second exemplary embodiment of the present invention includes, like the system operations management apparatus 1 in the first exemplary embodiment mentioned above, a performance information collection unit 11, a performance information accumulation unit 12, a correlation model generation unit 16, an analytical model accumulation unit 17, a correlation change analysis unit 18, a failure analysis unit 13, an administrator dialogue unit 14, a handling executing unit 15 and an analysis schedule accumulation unit 19. The performance information collection unit 11 acquires performance information from the service-for-customers execution system 4. The performance information accumulation unit 12 stores the acquired performance information. The correlation model generation unit 16 generates a correlation model based on the acquired performance information. The analytical model accumulation unit 17 stores the generated correlation model. The correlation change analysis unit 18 analyzes abnormality of performance information acquired using a correlation model. The failure analysis unit 13 determines abnormality of the service-for-customers execution system 4 based on the result of analysis by the correlation change analysis unit 18. The administrator dialogue unit 14 outputs the result of determination by the failure analysis unit 13. When there is an input of an improvement order against the content that the administrator dialogue unit 14 has outputted, the handling executing unit 15 performs improvement of the service-for-customers execution system 4 based on the order. The analysis schedule accumulation unit 19 stores an analysis schedule.

Moreover, as shown in FIG. 7, this system operations management apparatus 2 includes a periodical-model accumulation unit 20, a candidate information generation unit 21 and a correction candidate generation unit 22. The periodical-model accumulation unit 20 stores correlation models periodically generated by the correlation model generation unit 16. The candidate information generation unit 21 receives the correlation models from the periodical-model accumulation unit 20, and generates schedule candidate information which is a provisional schedule information draft based on the varying status of the content of those correlation models. The correction candidate generation unit 22 generates a correction candidate of schedule information by applying calendar information which is an attribute on the calendar to each analytical period in the schedule candidate information generated by the candidate information generation unit 21 sequentially (by comparing each analytical period and the calendar information and extracting an attribute on the calendar fitting in each analytical period).

As shown in FIG. 7, the periodical-model accumulation unit 20 is connected to the correlation model generation unit 16. As a result, the periodical-model accumulation unit 20 can store correlation models generated sequentially in the correlation model generation unit 16 sequentially.

Figure 8:
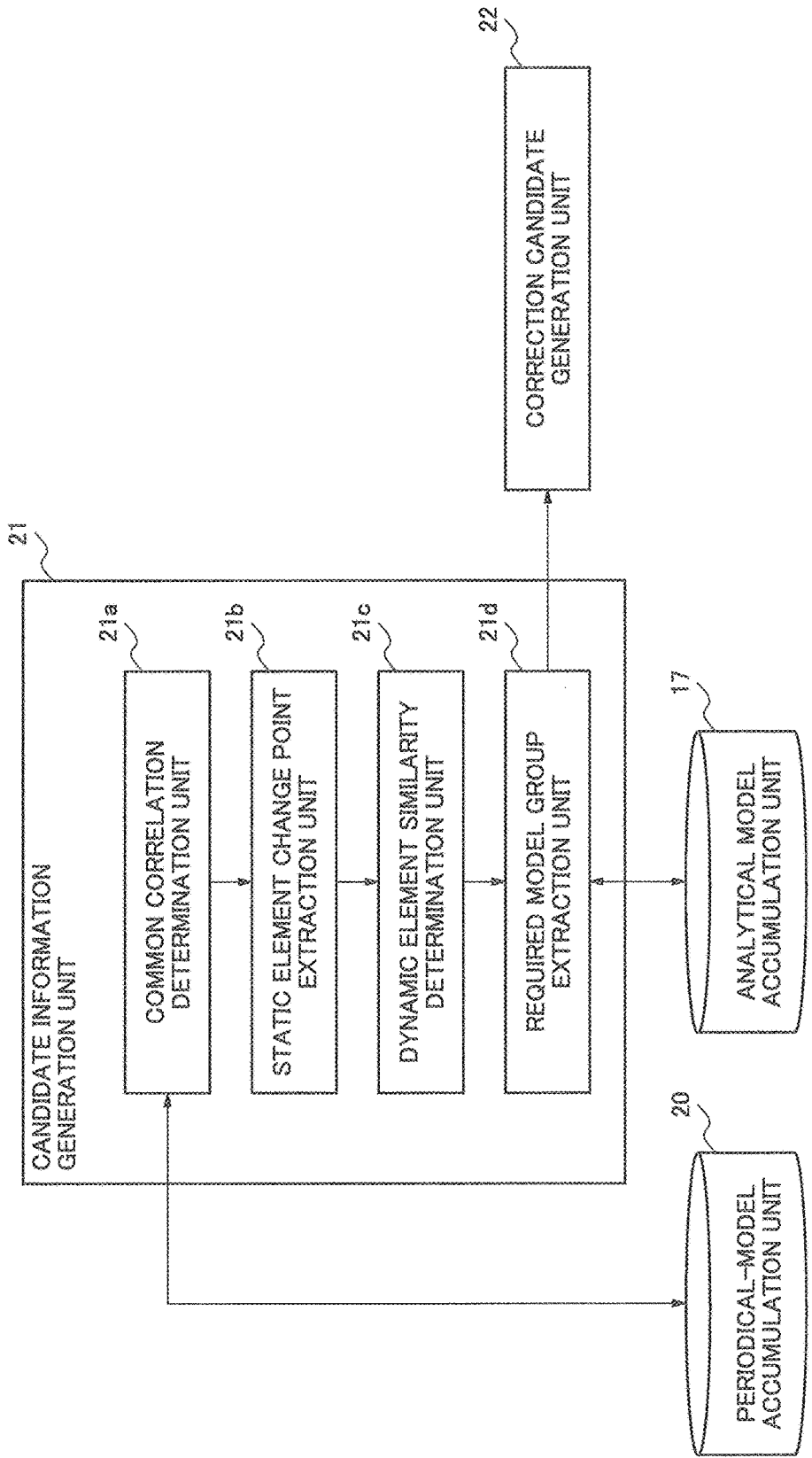
FIG. 8 A block diagram showing a structure of a candidate information generation unit 21 in the second exemplary embodiment of the present invention.

FIG. 8 is a block diagram showing a structure of the candidate information generation unit 21 in the second exemplary embodiment of the present invention.

As shown in FIG. 8, the candidate information generation unit 21 includes a common correlation determination unit 21*a*, a static element change point extraction unit 21*b*, a dynamic element similarity determination unit 21*c* and a required model group extraction unit 21*d*. The common correlation determination unit 21*a* extracts a common correlation between correlation models which have been created by the correlation model generation unit 16 in consecutive time segments. The static element change point extraction unit 21*b* extracts a time point at which a correlation model for performance information analysis is changed based on increase and decrease of the number of common correlations extracted by the common correlation determination unit 21*a*. The dynamic element similarity determination unit 21*c* confirms the similarity degree between correlations included in a correlation model for a new analytical period extracted by the static element change point extraction unit 21*b* and correlations included in a correlation model used for an analytical period in the past. The required model group extraction unit 21*d* generates schedule candidate information based on each analytical period to which a correlation model has been assigned by the static element change point extraction unit 21*b* and the dynamic element similarity determination unit 21*c*.

Figure 11:
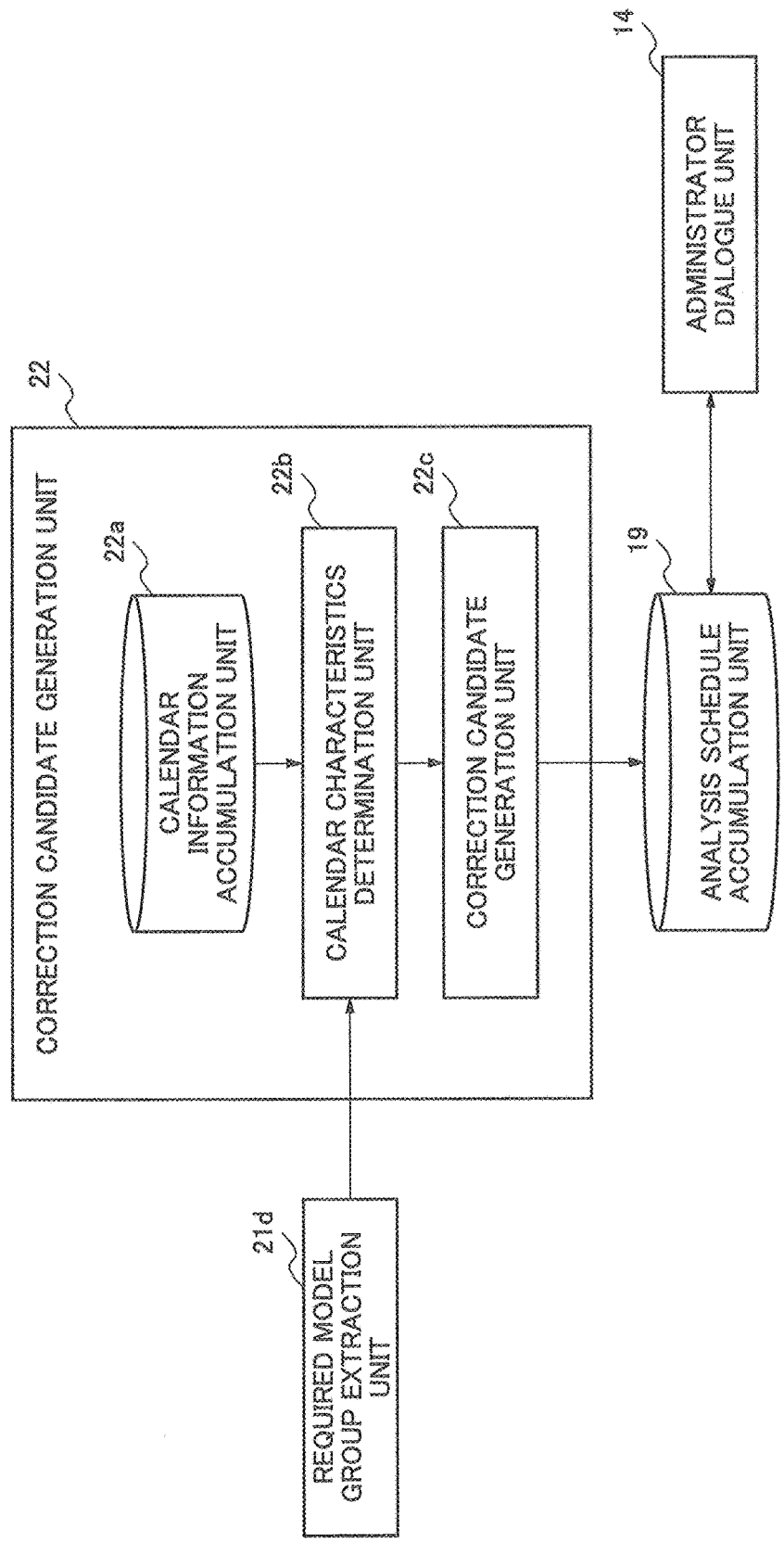
FIG. 11 A block diagram showing a structure of a correction candidate generation unit 22 in the second exemplary embodiment of the present invention.

FIG. 11 is a block diagram showing a structure of the correction candidate generation unit 22 in the second exemplary embodiment of the present invention.

As shown in FIG. 11, the correction candidate generation unit 22 includes a calendar information accumulation unit 22*a*, a calendar characteristics determination unit 22*b* and a correction candidate generation unit 22*c*. The calendar information accumulation unit 22*a* stores information about an attribute on the calendar (hereinafter, calendar information) such as day-of-week information and holiday information. The calendar characteristics determination unit 22*b* receives schedule candidate information from the required model group extraction unit 21*d* in the candidate information generation unit 21 and determines characteristics of a date in each analytical period in schedule candidate information (hereinafter, calendar characteristics) by applying calendar information stored in the calendar information accumulation unit 22*a* to the content of the schedule candidate information. The correction candidate generation unit 22*c* compares the calendar characteristics determined by the calendar characteristics determination unit 22*b* with the content of existing schedule information, and, when there is a difference between them, generates a correction candidate of the schedule information based on the content of the calendar characteristics.

Also, in the second exemplary embodiment of the present invention, the correlation model generation unit 16 and the administrator dialogue unit 14 further include new functions in addition to the various functions mentioned above. Hereinafter, those functions will be described.

The correlation model generation unit 16 generates correlation models in a time interval set in advance from outside. As a result, correlation models corresponding to various operational situations of the service-for-customers execution system 4 can be obtained.

The administrator dialogue unit 14 acquires a correction candidate of schedule information from the analysis schedule accumulation unit 19 and displays it. As a result, it is possible to show a generated schedule information draft to a system administrator and to ask the system administrator to determine whether to change the schedule information or not.

Meanwhile, in the second embodiment of the present invention, it is supposed that a model generation unit 30 includes the correlation model generation unit 16, the candidate information generation unit 21 and the correction candidate generation unit 22. It is also supposed that an analysis unit 31 includes the correlation change analysis unit 18 and the failure analysis unit 13.

[Periodic Generation of Correlation Models]

Generation of a correlation model in the second exemplary embodiment of the present invention will be described centering on portions different from the first exemplary embodiment mentioned above.

As mentioned above, the correlation model generation unit 16 generates correlation models in a time interval (in each time segment) set in advance from outside. Here, as an example of setting of the time interval, a system administrator can set content indicating "generate a correlation model at 15:00 every day" regarding a time interval.

Meanwhile, the length of each of the time interval (time segment) may be the same or different for each time interval (time segment).

Correlation models generated sequentially are stored in the periodical-model accumulation unit 20 sequentially, not in the analytical model accumulation unit 17.

[Generation of Schedule Candidate Information]

Next, generation of schedule candidate information by the candidate information generation unit 21 mentioned above will be described below.

The common correlation determination unit 21a takes out a plurality of correlation models stored in the periodical-model accumulation unit 20. Then, among the correlation models taken out, two models generated based on pieces of performance information in two consecutive acquisition time segments respectively are compared and common correlations (correlation functions, for example) therebetween are extracted.

The common correlation determination unit 21a performs this operation for all combinations of correlation models generated in two consecutive time segments.

Next, the static element change point extraction unit 21b confirms an over-time change of the number of the common correlations based on the common correlations extracted by the common correlation determination unit 21a.

This confirmation operation of an over-time change of the number of the common correlations by the static element change point extraction unit 21b will be described using a specific example.

As an example, a case in which there are correlation models P, Q, R, S and T generated for each of consecutive time segments p, q, r, s and t, respectively by the correlation model generation unit 16 based on performance information acquired by the performance information collection unit 11 will be considered.

The static element change point extraction unit 21b confirms (a) the number of common correlations between the correlation model P and the correlation model Q, (b) the number of common correlations between the correlation model Q and the correlation model R, (c) the number of common correlations between the correlation model R and the correlation model S, and (d) the number of common correlations between the correlation model S and the correlation model T, sequentially.

It is assumed that the number of common correlations is 3 in the combination (a), 2 in the combination (b), 3 in the combination (c), 0 in the combination (d) as a result of the confirmation by the static element change point extraction unit 21b.

The static element change point extraction unit 21b determines a time point at which an amount of over-time change of the number of common correlations between correlation models in the two consecutive time segments mentioned above exceeds a numerical value set in advance from outside as a time point at which a correlation model for performance information analysis should be changed (a division point of an analytical period).

In this case, it is supposed that the setting has content indicating "change a correlation model at a time when a change in the number of common correlations is equal to or more than 3."

As a result, in the above-mentioned case, the amount of change is 1 when moving from the combination (a) to the combination (b), 1 when from the combination (b) to the combination (c), and 3 when from the combination (c) to the combination (d).

Therefore, the time point when moving from the combination (c) to the combination (d) meets the setting, and thus the static element change point extraction unit 21b determines that this is a time point to change a correlation model, that is, a division point of an analytical period. Then, the static element change point extraction unit 21b divides the analytical period at this division point.

Next, the dynamic element similarity determination unit 21c temporarily assigns the latest correlation model among correlation models generated by the correlation model generation unit 16 periodically to a new analytical period which is set according to the division of an analytical period mentioned above.

Moreover, the dynamic element similarity determination unit 21c confirms the similarity degree between the content of the correlation model assigned temporarily and the content of a correlation model assigned before division of an analytical period by the static element change point extraction unit 21b (a correlation model which has been assigned to each of the analytical periods before the division point).

As a result of this confirmation, when it is confirmed that both of them are similar since the similarity degree exceeds a criterion set in advance, the dynamic element similarity determination unit 21c changes the correlation model in the new analytical period to the correlation model assigned before the division (to the correlation model similar to the correlation model assigned temporarily among the correlation models assigned to the respective analytical periods before the division point).

Here, division of an analytical period and assignment of a correlation model for each analytical period by the static element change point extraction unit 21b and the dynamic element similarity determination unit 21c mentioned above will be described further based on FIG. 9.

Figure 9:
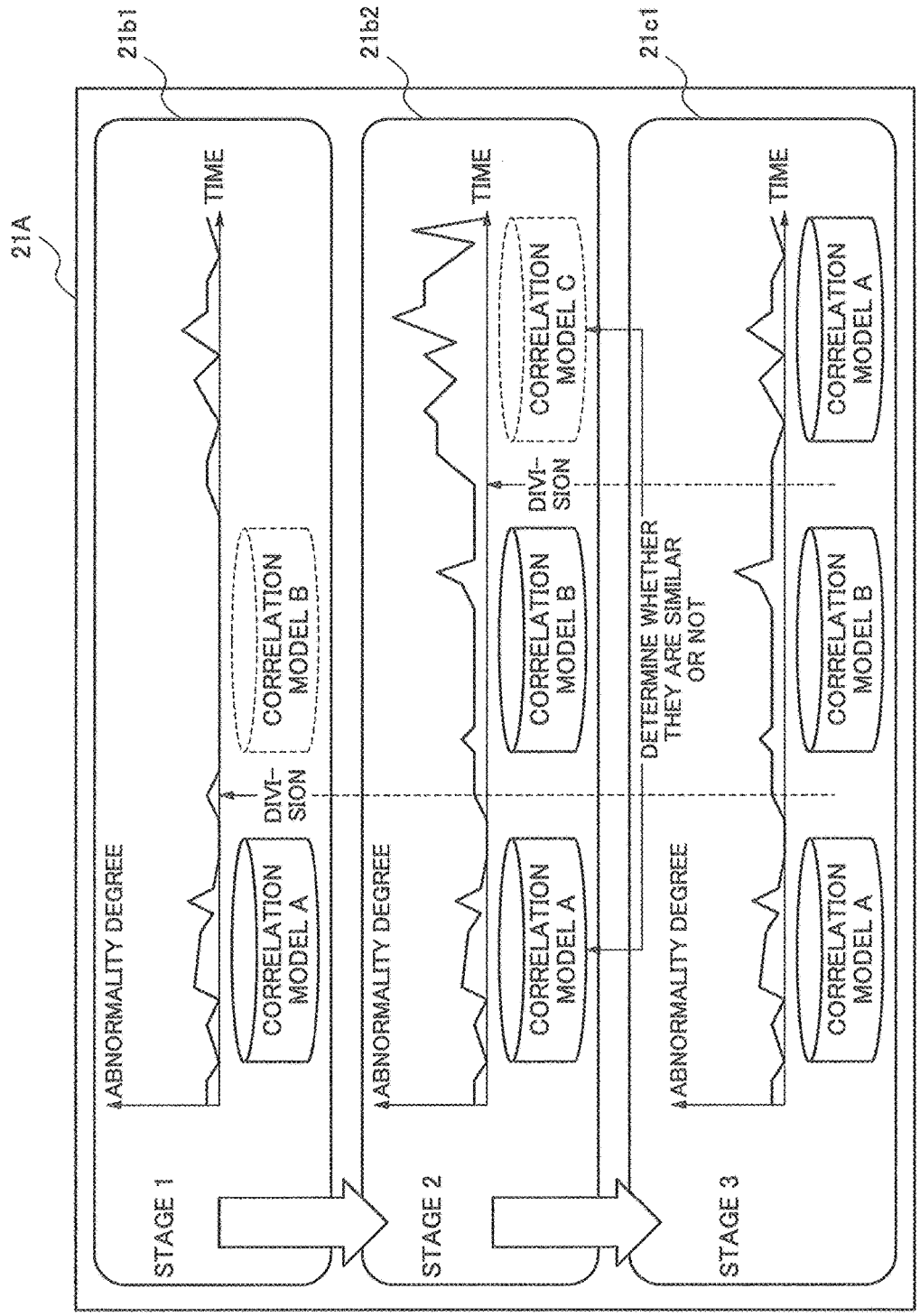
FIG. 9 An explanatory drawing showing an example of an operation for generating schedule candidate information in the second exemplary embodiment of the present invention.

FIG. 9 is an explanatory drawing showing an example of an operation for generating schedule candidate information in the second exemplary embodiment of the present invention.

In 21A of this FIG. 9, division of an analytical period and assignment of a new correlation model are indicated. In the stage 1 (21b1) of FIG. 9, the period where performance information analysis has been made by correlation model A is divided and correlation model B is set newly. In this case, when performance information analysis is being carried out with the correlation model A, the static element change point extraction unit 21b of the candidate information generation unit 21 finds out a difference between correlation models generated periodically, then divides the analytical period, and assigns the correlation model B which is the latest periodical correlation model to that period.

In the stage 2 (21b2) of FIG. 9, after analyses using the correlation model B have continued, the static element change point extraction unit 21b sets a new analytical period and assigns a correlation model C which is the latest periodical correlation model, in a similar way. At the same time, the dynamic element similarity determination unit 21c of the candidate information generation unit 21 determines the similarity of correlation model A and correlation model C. As a result, when being determined that they are similar, the dynamic element similarity determination unit 21c assigns the correlation model A, not the correlation model C, as a correlation model to the new period as shown in the stage 3 (21c1) of FIG. 9.

By this, a situation in which different analytical models are generated for analytical period respectively regardless of existing similarity between correlation models set for different analytical periods, and thus a large number of correlation models are generated and the memory capacity for storage runs short can be prevented. Moreover, decrease of the operation speed of the system operations management apparatus 2 as a whole because of shortage of a memory for storage and a situation in which the operation thereof becomes unstable because of the same reason can be prevented.

Next, the required model group extraction unit 21*d* generates schedule candidate information by linking each analytical period to which a correlation model has been assigned by the static element change point extraction unit 21*b* and the dynamic element similarity determination unit 21*c* together to one.

Figure 10:
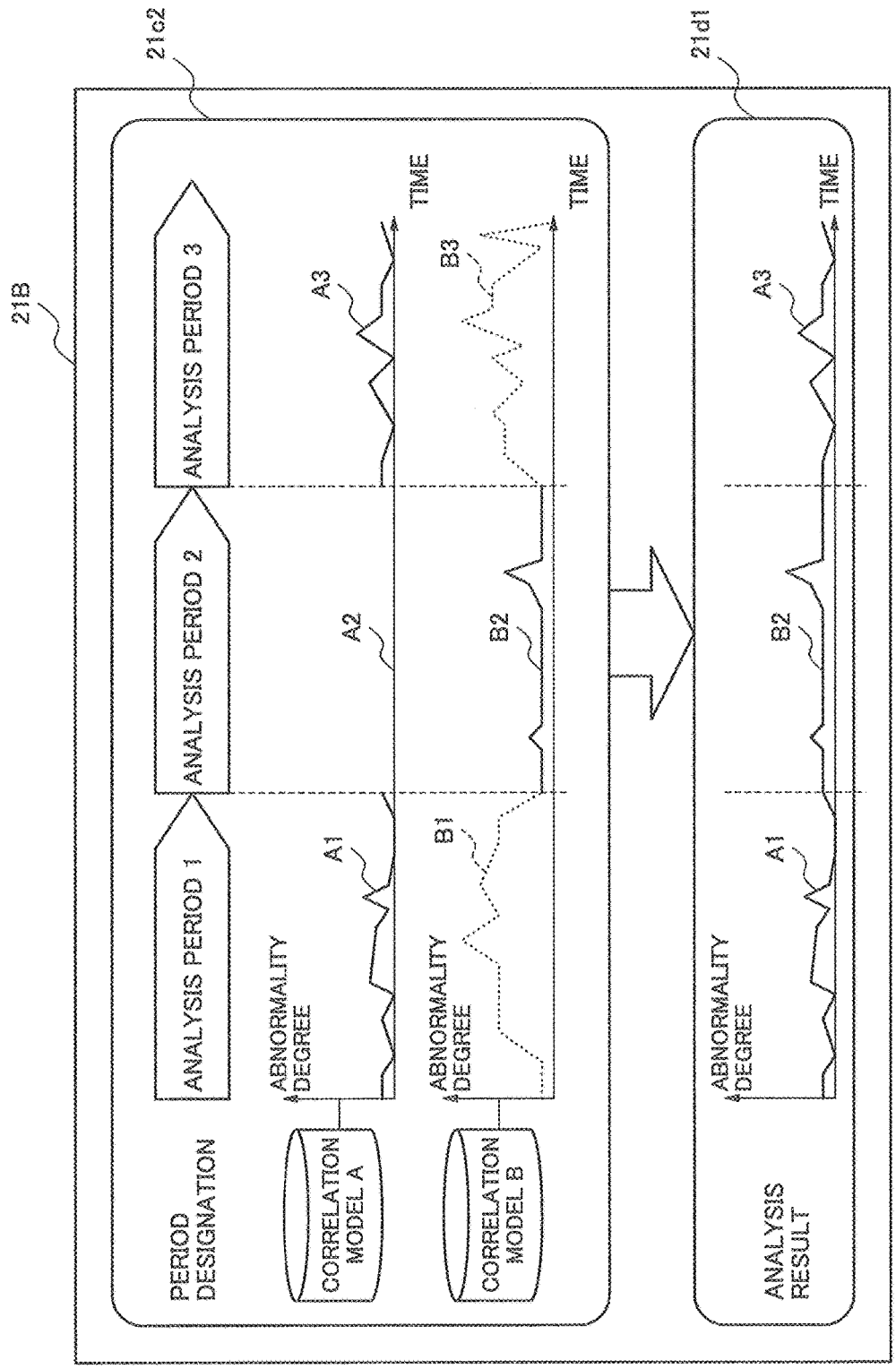
FIG. 10 An explanatory drawing showing an example of an operation for generating a correlation change analysis result in the second exemplary embodiment of the present invention.

FIG. 10 is an explanatory drawing showing an example of the operation for generating a correlation change analysis result in the second exemplary embodiment of the present invention.

Here, 21B of FIG. 10 indicates a result of analysis of a correlation change in the second exemplary embodiment of the present invention.

As shown in 21*c*2 of FIG. 10, the correlation model A or B is assigned to each of analytical periods 1, 2 and 3 by the static element change point extraction unit 21*b* and the dynamic element similarity determination unit 21*c* performing the assignment operation of a correlation model to analytical periods mentioned above. Here, among the results of analysis in analytical periods 1, 2 and 3, the results of analysis using correlation model A is referred to as A1 and A3, respectively. Similarly, the result of analysis using correlation model B is referred to as B2.

As shown in 21*d*1 of FIG. 10, the analysis result A1, the analysis result B2, and the analysis result A3 mentioned above are generated as the results of analysis.

The required model group extraction unit 21*d* accumulates the correlation models assigned to each of the analytical periods of the schedule candidate information in the analytical model accumulation means 20 and sends the schedule candidate information to the calendar characteristics determination unit 22*b* of the correction candidate generation means 22.

Figure 12:
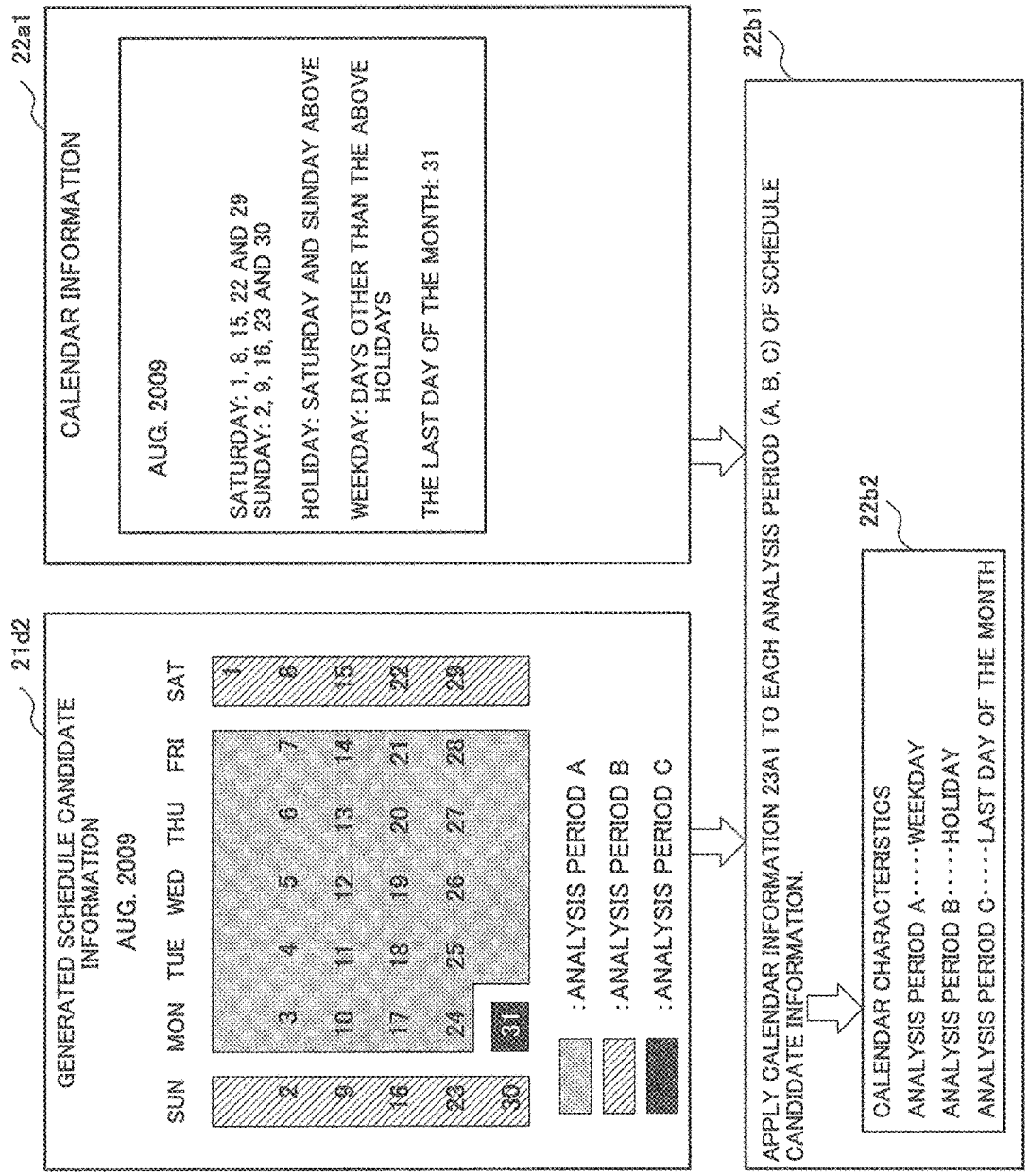
FIG. 12 An explanatory drawing showing an example of a generation procedure of a correction candidate of an analysis schedule in the second exemplary embodiment of the present invention.

FIG. 12 is an explanatory drawing showing an example of the generation procedure of a correction candidate of an analysis schedule in the second exemplary embodiment of the present invention.

For example, the required model group extraction unit 21*d* sends schedule candidate information 21*d*2 of FIG. 12 to the calendar characteristics determination unit 22*b*.

[Generation of a Correction Candidate of Schedule Information]

The calendar characteristics determination unit 22*b* receives schedule candidate information from the required model group extraction unit 21*d* and acquires calendar information from the calendar information accumulation unit 22*a*. Here, the calendar information is created by a system administrator in advance.

Then, the calendar characteristics determination unit 22*b* compares the content of the schedule candidate information and the calendar information, and then applies corresponding calendar information to each of analytical periods in the schedule candidate information sequentially. As a result, calendar characteristics are determined.

Here, determination of calendar characteristics by the calendar characteristics determination unit 22*b* mentioned above will be described further based on FIG. 12.

As shown in FIG. 12, a case in which schedule candidate information 21*d*2 for August, 2009 received from the required model group extraction unit 21*d* is divided into three kinds of analytical periods A to C, that are Saturday and Sunday, Monday to Friday, and the last day of the month, respectively will be considered. In this case, it is supposed that attributes on the calendar of "holiday", "weekday" and "last day of the month" are set for Saturday and Sunday, Monday to Friday and Aug. 31, 2009, respectively in calendar information 22*a*1.

At that time, the calendar characteristics determination unit 22*b* compares the schedule candidate information 21*d*2 and this calendar information 23*a*1, and extracts an attribute of the calendar information 23*a*1 fitting in with each analytical period of the schedule candidate information 21*d*2 (generation procedure 21*b*1). As a result, calendar characteristics 22*b*2 is determined for the respective analytical periods in a way that the analytical period corresponding to Saturday and Sunday is "holiday", the analytical period corresponding to Monday to Friday is "weekday" and the analytical period corresponding to August 31 is "last day of the month".

By determination of the calendar characteristics, an attribute on the calendar of each analytical period can be specified automatically without investigating the content of schedule candidate information for each analytical period point by point.

Next, the correction candidate generation unit 22*c* receives the calendar characteristics from the calendar characteristics determination unit 22*b* and receives schedule information generated by a system administrator in advance from the analysis schedule accumulation unit 19. Then, the correction candidate generation unit 22*c* compares the content of the calendar characteristics and the content of the schedule information which has been already generated.

As a result of this comparison, when the content that is indicated by the calendar characteristics has changed from the content of the schedule information generated in advance, the schedule information generation unit 22*c* generates a correction candidate of the schedule information based on the content of calendar characteristics. The schedule information generation unit 22*c* stores this correction candidate of the schedule information in the analysis schedule accumulation unit 19.

Figure 13:
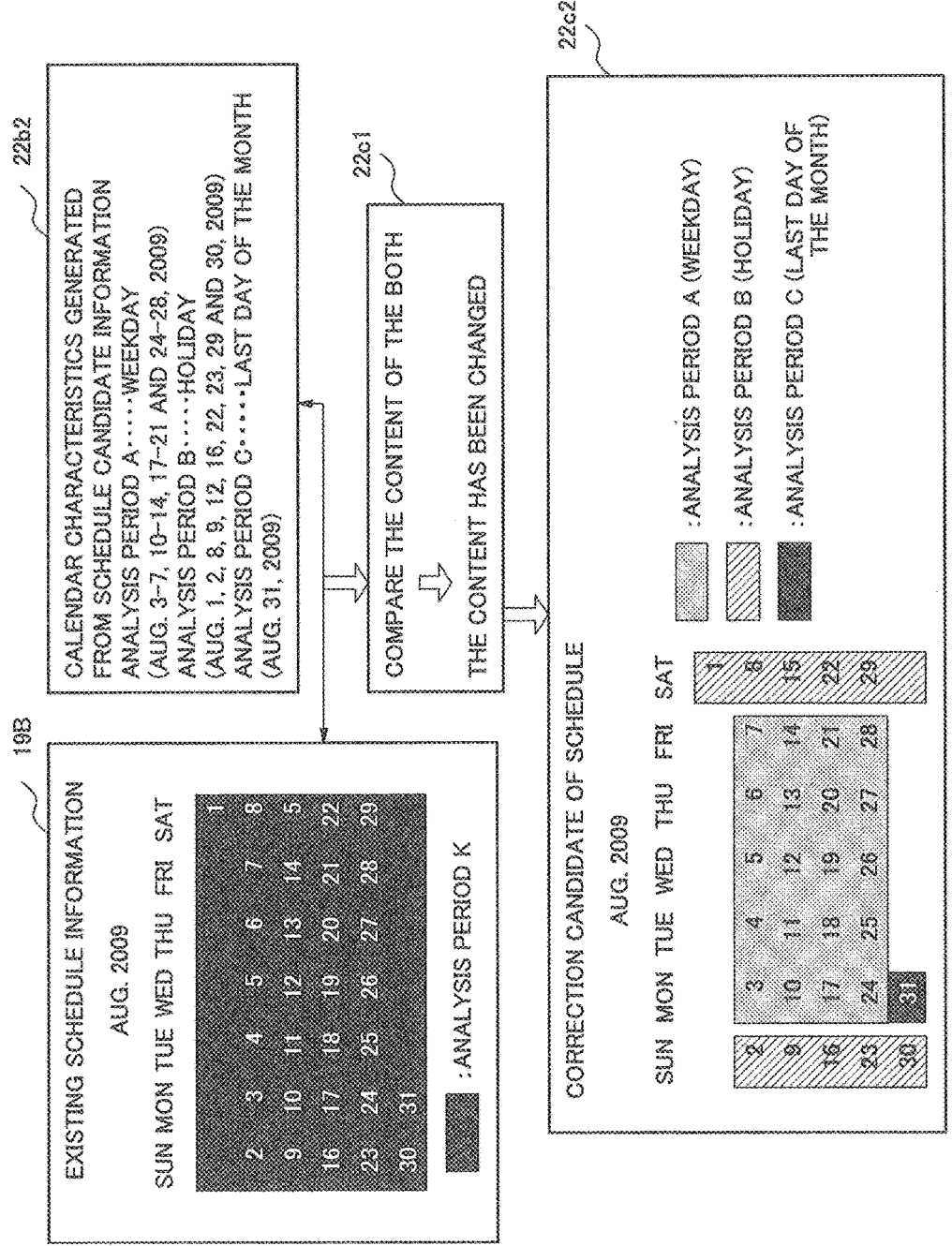
FIG. 13 An explanatory drawing showing an example of a generation procedure of a correction candidate of an analysis schedule in the second exemplary embodiment of the present invention (continuation of FIG. 12).

FIG. 13 is an explanatory drawing showing an example of generation procedure of a correction candidate of an analysis schedule in the second exemplary embodiment of the present invention (continuation of FIG. 12).

Here, the function for generating a correction candidate of schedule information by the schedule information generation unit 21*c* mentioned above will be described further based on FIG. 13.

As shown in FIG. 13, it is supposed that the calendar characteristics 22*b*2 has been generated by the calendar characteristics determination unit 22*b*, and existing schedule information 19B is being stored in the analysis schedule accumulation unit 19.

When both of them are compared, the content of calendar characteristics 22*b*2 has changed from the content of existing schedule information 19B clearly (generation procedure 22*c*1). Therefore, the schedule information generation unit 22*c* reflects the calendar characteristics 22*b*2 in schedule information, so that generates correction candidate 22*c*2 of a schedule.

As a result, even if existing schedule information is not suitable, suitable schedule information can be obtained automatically.

[Indication of a Correction Candidate of Schedule Information]

The administrator dialogue unit 14 takes out a correction candidate of schedule information along with the schedule information generated in advance from the analysis schedule accumulation unit 19 and displays both of them on an identical screen.

Figure 14:
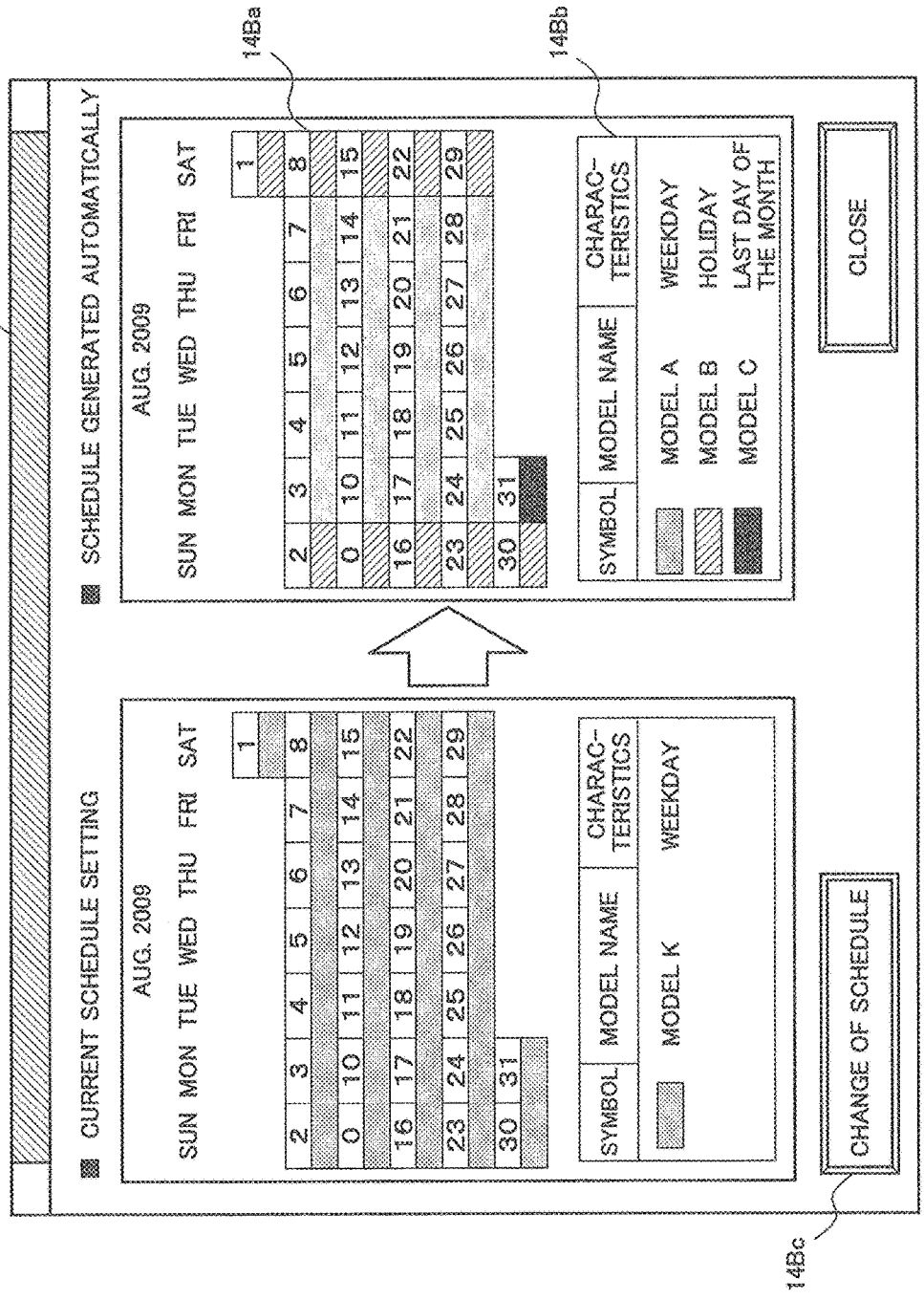
FIG. 14 An explanatory drawing showing an example of content displayed by an administrator dialogue unit 14 in the second exemplary embodiment of the present invention.

FIG. 14 is an explanatory drawing showing an example of content displayed by the administrator dialogue unit 14 in the second exemplary embodiment of the present invention.

For example, the administrator dialogue unit 14 displays display screen 14B of FIG. 14.

As shown in this display screen 14B, the administrator dialogue unit 14 displays both of the schedule information generated in advance and the correction candidate of the schedule information placing them side-by-side so that comparison therebetween can be performed easily.

The administrator dialogue unit 14 also displays a correlation model for each analytical period (14Ba) and a list of required correlation models (14Bb) in the schedule information generated in advance and the correction candidate of the schedule information simultaneously. The reason of this is that the differences between the schedule information generated in advance and the schedule information can be made clear by clearly indicating correlation models which are constituent elements of them.

Moreover, the administrator dialogue unit 14 also displays operation button 14Bc for changing the regular schedule information from the schedule information generated in advance to the correction candidate of the schedule information. When a system administrator performs input indicating that the regular schedule information is changed using this operation button 14Bc, information concerning this input is sent to the analysis schedule accumulation unit 19 from the administrator dialogue unit 14, and the content of the schedule information generated in advance is corrected based on the content of the correction candidate of the schedule information.

Thus a burden of a system administrator at the time of schedule information generation can be reduced substantially because a system administrator generates schedule information of rough content in advance and then the system operations management apparatus 2 correct the content to content suitable for correlation change analysis.

The other functions in each of the units are identical with those of the first exemplary embodiment mentioned above.

[Operations of the Second Exemplary Embodiment]

Next, the operation of the system operations management apparatus 2 in the second exemplary embodiment of the present invention will be described below based on FIG. 15 and FIG. 16 centering on portions different from the first exemplary embodiment mentioned above.

Figure 15:
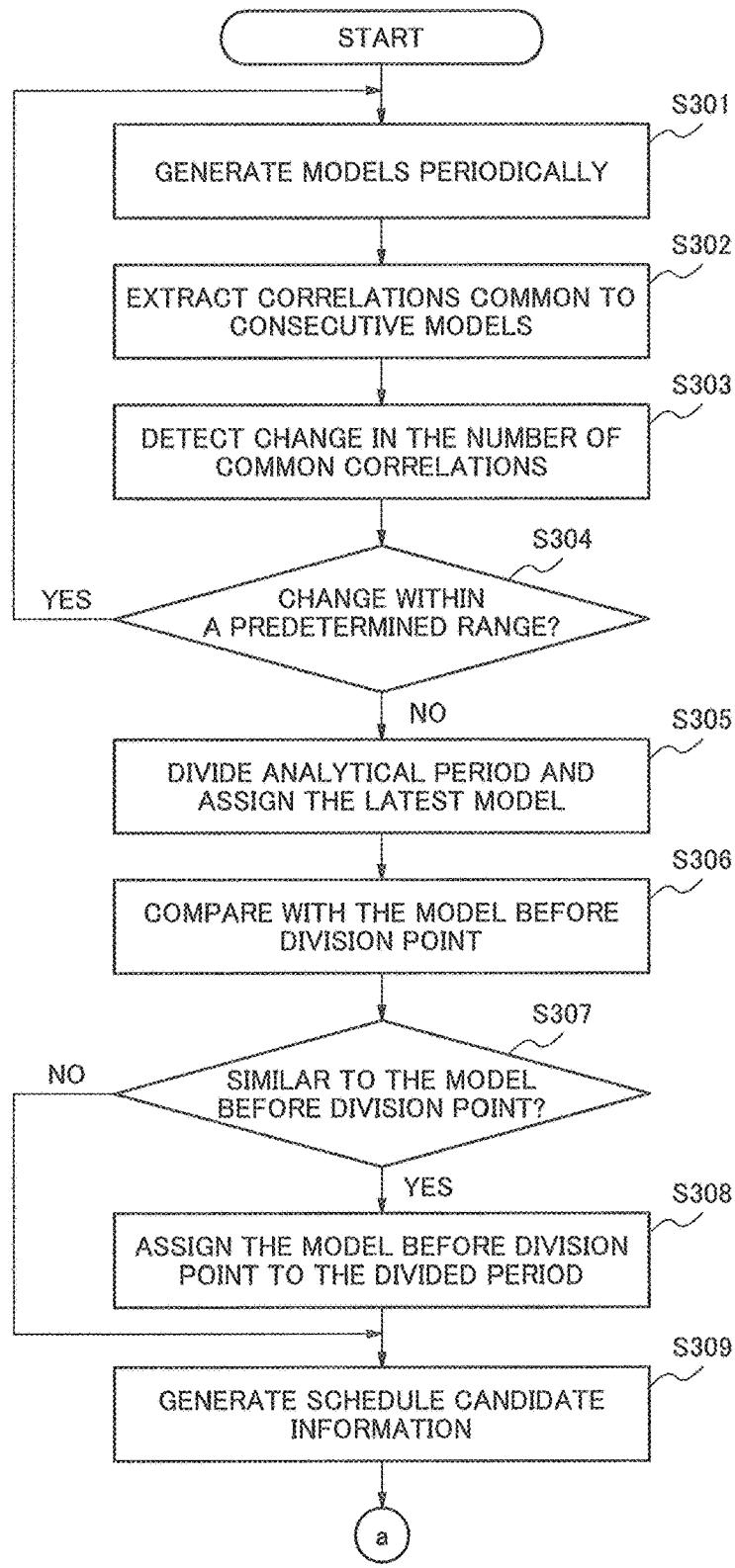
FIG. 15 A flow chart showing an operation for generating schedule candidate information in the second exemplary embodiment of the present invention.

FIG. 15 is a flow chart showing the operations for generating schedule candidate information in the second exemplary embodiment of the present invention.

First, like the system operations management apparatus 1 of the first exemplary embodiment mentioned above, the performance information collection unit 11 acquires performance information periodically from a server of the service-for-customers execution system 3 and stores it in the performance information accumulation unit 12 sequentially.

Next, the correlation model generation unit 16 generates correlation models in a time interval set from outside in advance (FIG. 15: Step S301, the correlation model periodical generation step). After that, generated correlation models are stored in the periodical-model accumulation unit 20 sequentially.

Next, the common correlation determination unit 21a of the candidate information generating 21 obtains correlation models corresponding to time segments set from outside in advance from the periodical-model accumulation unit 20. Then, the common correlation determination unit 21a compares two correlation models generated in two consecutive time segments respectively, and extracts correlations (such as correlation functions) common to both of them (FIG. 15: Step S302, the common correlation extracting step) among these acquired correlation models.

Next, the static element change point extraction unit 21b confirms an over-time change of the number of common correlations mentioned above (FIG. 15: Step S303), and confirms whether the change is within a reference range set from outside in advance (FIG. 15: Step S304).

At that time, when the change in the number of correlation functions is within the reference range (Step S304/yes), the static element change point extraction unit 21b determines that performance information should be analyzed using the same correlation model. On the other hand, when change in the number of correlation functions exceeds the reference range (Step S304/no), the static element change point extraction unit 21b determines this time point as a time point at which a correlation model for correlation change analysis is changed and divides the analytical period at that time point (FIG. 15: Step S305, the correlation model division step).

Next, the dynamic element similarity determination unit 21c assigns the latest correlation model to a correlation model for a new analytical period made by the static element change point extraction unit 21b temporarily. After that, the content of the correlation model assigned to the analytical period before this division point and the content of the above-mentioned latest correlation model are compared (FIG. 15: Step S306), and the similarity degrees between them is confirmed (FIG. 15: Step S307).

At that time, when it is confirmed that they are similar since the similarity exceeds a reference range set in advance (Step S307/yes), the dynamic element similarity determination unit 21c assigns the correlation model before the division point to the correlation model of this new analytical period (FIG. 15: Step S308, the correlation model assignment step). On the other hand, when being confirmed that the similarity degree is equal to or lower than the reference range (Step S307/no), the dynamic element similarity determination unit 21c assigns the above-mentioned temporarily assigned correlation model to the correlation model of this new analytical period.

Next, the required model group extraction unit 21d generates schedule candidate information based on each analytical period to which a correlation model has been assigned by the static element change point extraction unit 21b and the dynamic element similarity determination unit 21c, and sends it to the calendar characteristics determination unit 22b of the correction candidate generation unit 22 (FIG. 15: Step S309, the candidate information generation and transmission step). Also, the required model group extraction unit 21d stores each correlation model assigned to each analytical period of the schedule candidate information in the analytical model accumulation unit 17 in association with each analytical period.

Figure 16:
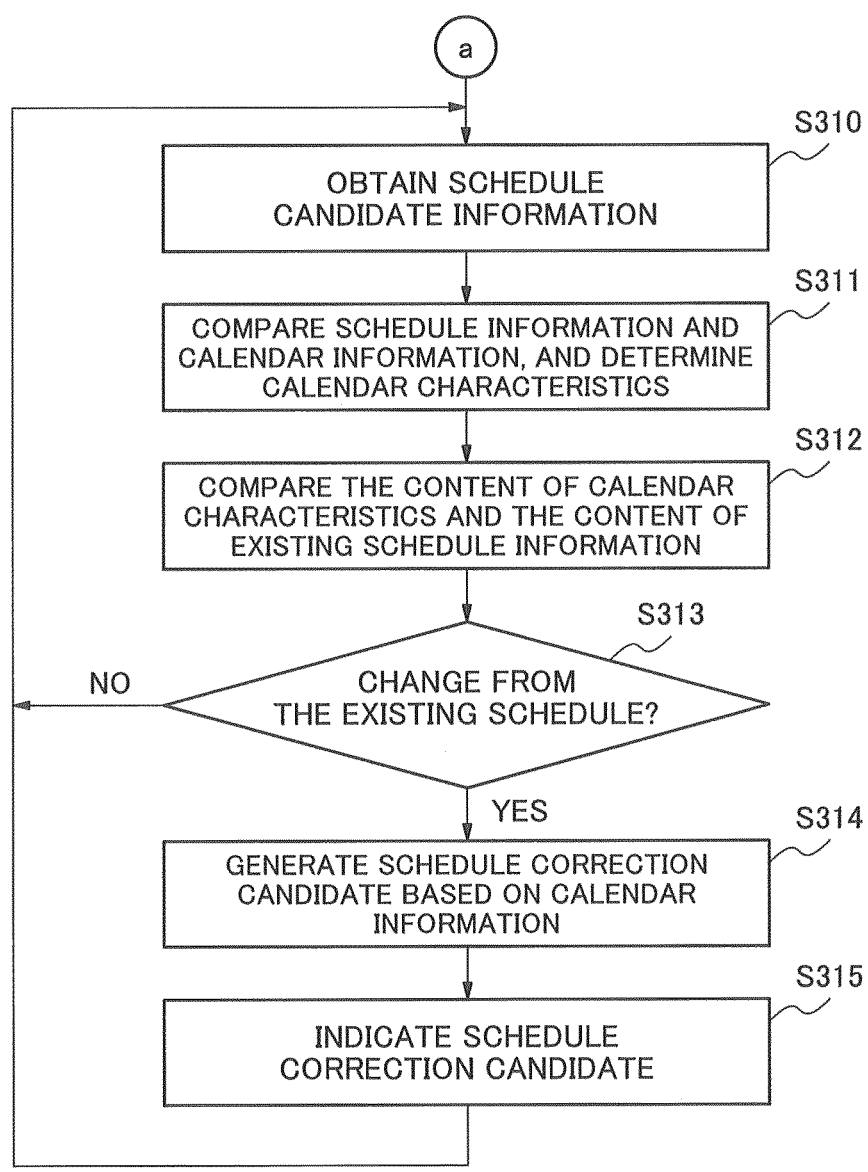
FIG. 16 A flow chart showing an operation for generating a correction candidate of schedule information in the second exemplary embodiment of the present invention.

FIG. 16 is a flow chart showing the operations for generating a correction candidate of schedule information in the second exemplary embodiment of the present invention.

Next, the calendar characteristics determination unit 22b receives the schedule candidate information from the required model group extraction unit 21d (FIG. 16: Step S310, the candidate information obtaining step), and obtains calendar information from the calendar information accumulation unit 22a. The calendar characteristics determination unit 22b compares the content of the schedule candidate information and the content of the calendar information and determines calendar characteristics by applying the calendar information to each analytical period in the schedule candidate information (FIG. 16: Step S311, the calendar characteristics determination step).

Next, the correction candidate generation unit 22c receives the calendar characteristics determined by the calendar characteristics determination unit 22b, and compares the content of the calendar characteristics and the content of the schedule information which has been already generated (FIG. 16: Step S312).

As a result of this comparison, when it is confirmed that the content of the calendar characteristics has changed from the content of the schedule information which has been already created (Step S313/yes), the correction candidate generation unit 22c generates a correction candidate of the schedule information based on the calendar characteristics and stores it in the analysis schedule accumulation unit 19 (FIG. 16: Step S314, the correction candidate generating and storing step). Then, the administrator dialogue unit 14 obtains this correction candidate of the schedule information from the schedule accumulation unit 19 and shows it outside (FIG. 16: Step S315, the correction candidate output step). On the other hand, as a result of the above-mentioned comparison, when it is confirmed that the content of the calendar characteristics has not changed from the content of the existing schedule information (Step S313/no), the correction candidate generation unit 22c does not generate a correction candidate of the schedule information.

When there is an input which instructs change of the schedule information from outside to the administrator dialogue unit 14, the administrator dialogue unit 14 sends information associated with the input to the analysis schedule accumulation unit 19 and changes the regular schedule information used for correlation change analysis to the content of the correction candidate.

After that, the correlation change analysis unit 18 performs correlation change analysis of performance information acquired for analyses based on the generated schedule information.

The steps after this is the same as the first exemplary embodiment mentioned above.

Here, the concrete content that is carried out in each step mentioned above may be programmed to be executed by a computer.

[The Effect of the Second Exemplary Embodiment]

According to the second exemplary embodiment of the present invention, even when a system administrator does not have much knowledge and experience and thus it is difficult for the system manager to generate schedule information personally, the system administrator does not need to grasp each business pattern correctly and then generate schedule information point by point, and as a result, a burden of the system administrator can be reduced substantially because the system operations management apparatus 2 generates the schedule information.

According to the second exemplary embodiment of the present invention, even when a business pattern is irregular and then it is difficult to register the business pattern as schedule information, it is possible to assign a correlation model according to a change in the service-for-customers execution system 4 automatically and accurately, and thus a highly accurate result of analysis according to actual utilization forms can always be provided because the system operations management apparatus 2 perceives the change in the environment of the service-for-customers execution system 4 over time and generates the schedule information according thereto flexibly.

As a case in which this effect works most effectively, there is a case in which the service-for-customers execution system 4 is used commonly by a plurality of sectors.

In this case, because there exist a plurality of users of the system, the usage pattern thereof becomes complicated. However, as mentioned above, according to the second exemplary embodiment of the present invention, because generation and change of a needed correlation model is automated, there is no decline in the accuracy of a result of analysis due to improper schedule setting, and thus an appropriate analysis result is always maintained. As a result, the efficiency of handling against performance deterioration of a managed system is improved.

Here, in the above-mentioned description, when a correlation model which should be changed is detected, the system operations management apparatus 2 generates a correction candidate of schedule information and displays the existing schedule information and the correction candidate side-by-side as shown in display screen 14B (FIG. 12), and, upon receiving an input of a correction order of the schedule information from a system administrator and the like, performs correction of the schedule information. However, the present invention is not limited to this example. For example, within a certain scope, the system operations management apparatus 2 may perform automatic correction of a schedule, or upon receiving an input from a system administrator and the like, it may plan a future schedule change or may re-execute analysis of performance data in the past. That is, the similar effect is obtained when a system operations management apparatus automatically generates schedule information which a system manager had to generate point by point conventionally.

Third Exemplary Embodiment

Next, a third exemplary embodiment of an operations management system according to the present invention will be described based on FIGS. 17 to 19.

Figure 17:
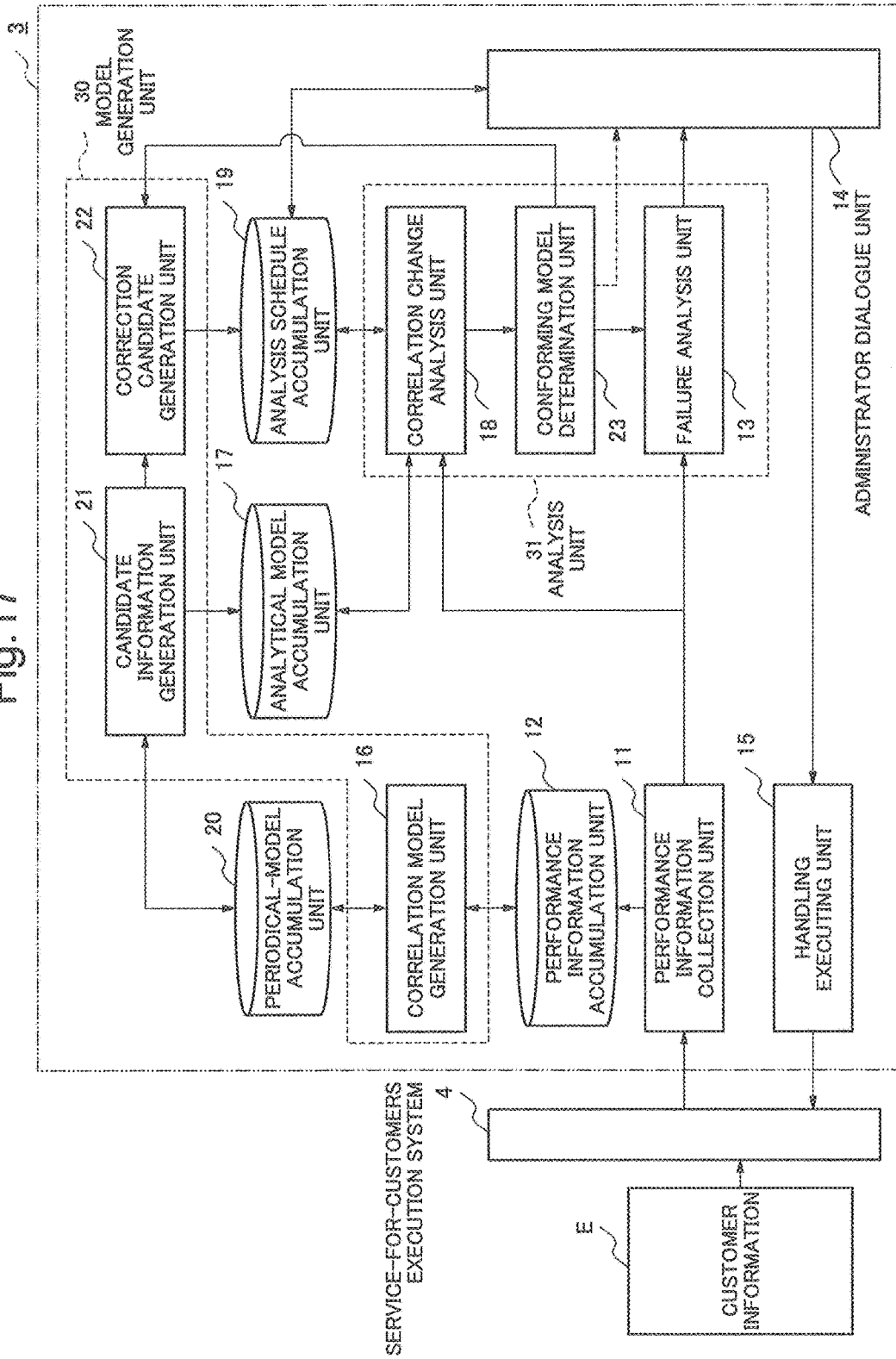
FIG. 17 A block diagram showing a structure of a third exemplary embodiment of a system operations management apparatus of the present invention.

FIG. 17 is a block diagram showing a structure of the third exemplary embodiment of a system operations management apparatus of the present invention.

As shown in FIG. 17, a system operations management apparatus 3 in the third exemplary embodiment of the present invention includes a performance information collection unit 11, a performance information accumulation unit 12, a correlation model generation unit 16, an analytical model accumulation unit 17, a correlation change analysis unit 18, a failure analysis unit 13, an administrator dialogue unit 14 and a handling executing unit 15 like the system operations management apparatus 2 in the second exemplary embodiment mentioned above. The performance information collection unit 11 acquires performance information from a service-for-customers execution system 4. The performance information accumulation unit 12 stores the acquired performance information. The correlation model generation unit 16 generates a correlation model based on the acquired performance information. The analytical model accumulation unit 17 stores the generated correlation model. The correlation change analysis unit 18 analyzes abnormality of acquired performance information using the correlation model. The failure analysis unit 13 determines abnormality of the service-for-customers execution system 4 based on the result of analysis by the correlation change analysis unit 18. The administrator dialogue unit 14 outputs the result of the determination by the failure analysis unit 13. When there is input of an improvement order against the content outputted by the administrator dialogue unit 14, the handling executing unit 15 performs improvement of the service-for-customers execution system 4 based on the order.

In addition, as shown in FIG. 17, the system operations management apparatus 3 in the third exemplary embodiment of the present invention includes, like the system operations management apparatus 2 in the second exemplary embodiment mentioned above, an analysis schedule accumulation unit 19, a periodical-model accumulation unit 20, a candidate information generation unit 21 and a correction candidate generation unit 22. The analysis schedule accumulation unit 19 stores an analysis schedule. The periodical-model accumulation unit 20 sequentially stores correlation models generated by the correlation model generation unit 16 periodically. The candidate information generation unit 21 generates schedule candidate information which is a schedule information draft based on performance information stored in the periodical-model accumulation unit 20. The correction candidate generation unit 22 generates a correction candidate of schedule information by applying an attribute on the calendar to the schedule candidate information.

Moreover, as shown in FIG. 17, the system operations management apparatus 3 includes a conforming model determination unit 23. When there are a plurality of results of correlation change analysis by the correlation change analysis unit 18, the conforming model determination unit 23 determines an order based on a degree of abnormality of each analysis result by comparing degrees of abnormality thereof.

The correlation change analysis unit 18, the failure analysis unit 13 and the administrator dialogue unit 14 further include new functions in addition to the respective functions mentioned above. Hereinafter, those functions will be described.

The correlation change analysis unit 18 performs not only correlation change analysis using the correlation model assigned according to schedule information but also correlation change analysis using the other correlation models accumulated in the analytical model accumulation unit 17 for performance information received from the performance information collection unit 11.

The failure analysis unit 13 receives results of analysis using the other correlation models in addition to the result of analysis using the correlation model assigned according to the schedule information from the conforming model determination unit 23, and performs failure analysis and sends the result thereof to the administrator dialogue unit 14.

The administrator dialogue unit 14 displays the result of analysis according to the schedule information received from the failure analysis unit 13 and the result of analysis with another correlation model together. Further, this administrator dialogue unit 14 receives an input indicating that the result of analysis using the another correlation model is made be a regular result of analysis, and corrects the content of the schedule information stored in the analysis schedule accumulation unit 19 based on the content of the another correlation model.

As a result, even if there are any defects in the content of schedule information in the above-mentioned first and second exemplary embodiment, correlation change analysis with a high degree of accuracy can be carried out by choosing a suitable correlation model from other correlation models and applying it to correlation change analysis.

Meanwhile, in the third embodiment of the present invention, it is supposed that the model generation unit 30 includes the correlation model generation unit 16, the candidate information generation unit 21, the correction candidate generation unit 22 and the conforming model determination unit 23. It is also supposed that the analysis unit 31 includes the correlation change analysis unit 18 and the failure analysis unit 13.

Hereinafter, the content of the third exemplary embodiment of the present invention will be explained in detail centering on portions different from the first and second exemplary embodiment mentioned above.

The correlation change analysis unit 18 obtains performance information for analyses from the performance information collection unit 11, and also obtains schedule information from the analysis schedule accumulation unit 19 and each correlation model for an analytical period set in advance from the analytical model accumulation unit 17.

Next, the correlation change analysis unit 18 performs correlation change analysis of the performance information for analyses using the correlation model assigned according to the schedule information. Moreover, the correlation change analysis unit 18 performs correlation change analysis using various correlation models obtained from the analytical model accumulation unit 17.

Then, the correlation change analysis unit 18 sends all analysis results of the above-mentioned correlation change analyses to the conforming model determination unit 23.

The conforming model determination unit 23 compares degrees of abnormality (the difference between an actual measurement value and a theoretical value) for the all results of analysis received from the correlation change analysis unit 18 and decides the order of each analysis result.

Then, the conforming model determination unit 23 confirms, in the analysis results using the other correlation models, whether there is a analysis result that has a degree of abnormality lower than that of the analysis result according to the schedule information or not. When such analysis result exists as a result of the confirmation, the conforming model determination unit 23 decides that the analysis result using the other correlation model as the alternative of an analysis result and decides the correlation model for this alternative of an analysis result to be a conforming model. Meanwhile, when there are a plurality of analysis results with an abnormality degree lower than that of the analysis result according to the schedule information, the conforming model determination unit 23 may decide an analysis result with the lowest degree of abnormality to be the alternative of an analysis result.

Finally, the conforming model determination unit 23 sends both of the analysis result according to the schedule information and the alternative of an analysis result to the failure analysis unit 13.

Here, as a method to compare the degree of abnormality of each analysis result by the conforming model determination unit 23, there is a method to judge from information whether a degree of abnormality is steadily large or steadily small, for example.

As one specific example of this, referring to 21c2 of FIG. 10, a case in which an analysis result A3 which is one of results of performance information analysis performed using a correlation model A and an analysis result B3 which is one of results of performance information analysis performed using a correlation model B are compared will be considered.

As a result of comparison of them, in the analysis result B3, the situation that a degree of abnormality is higher than that of the analysis result A3 continues for a long time (FIG. 10, 21c2). Therefore, in this case, the conforming model determination unit 23 determines that the analysis result B3 is not a suitable analysis result. Then, the conforming model determination unit 23 determines that the analysis result A3 is an analysis result more suitable than B3 because the degree of abnormality of the analysis result A3 is smaller than that of B3 steadily.

Therefore, in a case where a correlation model assigned according to the schedule information is the model B and its analysis result is B3, and there exists the analysis result A3 obtained using the correlation model A as an analysis result with another correlation model, the conforming model determination unit 22 determines that the analysis result A3 is the alternative of an analysis result.

When the alternative is determined in the conforming model determination unit 23, the failure analysis unit 13 receives both of the analysis result according to the schedule information and the alternative from this conforming model determination unit 23, and sends both of them to the administrator dialogue unit 14 after performing above mentioned failure analysis of the analysis result obtained according to the schedule information.

When the analysis result according to the schedule information and the alternative have been sent from the failure analysis unit 13, the administrator dialogue unit 14 receives the both of them and displays both of them simultaneously.

Figure 18:
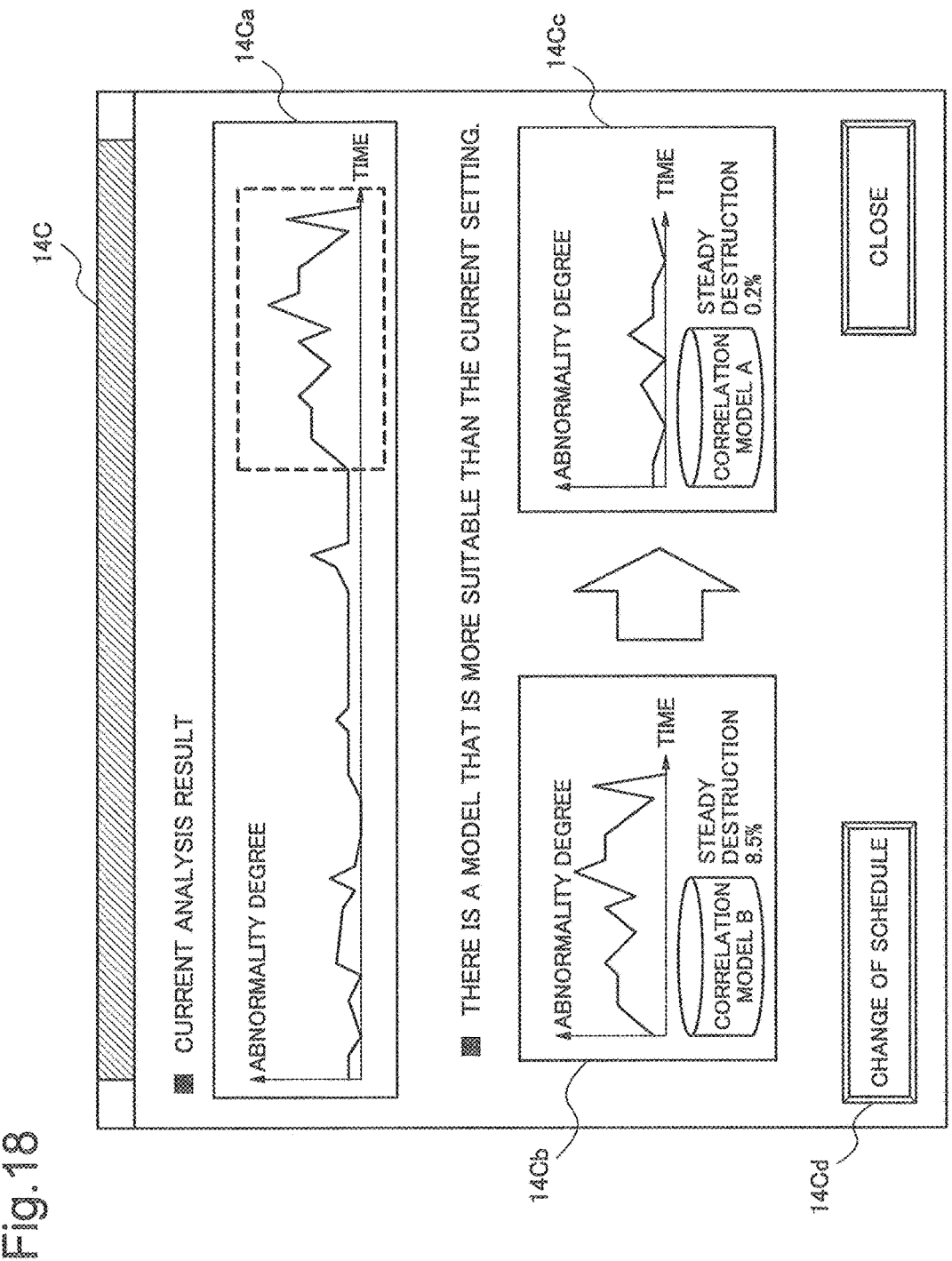
FIG. 18 An explanatory drawing showing an example of content displayed by the administrator dialogue unit 14 in the third exemplary embodiment of the present invention.

FIG. 18 is an explanatory drawing showing an example of content displayed by the administrator dialogue unit 14 in the third exemplary embodiment of the present invention.

For example, the administrator dialogue unit 14 displays a display screen 14C of FIG. 18.

This display screen 14C includes the current analysis results (analysis results according to schedule information) 14Ca that indicates a degree of abnormality (the difference between the actual measurement value and the theoretical value according to a correlation function). Also, the display screen 14C includes information 14Cb on analysis results in an analytical period for which an alternative of an analysis result exists among the current analysis results mentioned above and the correlation model that has been used therefor, and information 14Cc on analysis results of the alternative of an analysis result and the correlation model that has been used therefor. Further, display screen 14C includes an operation button 14Cd for adopting the alternative of an analysis result as the regular analysis result instead of the current analysis result.

As a result, a system administrator can input an improvement order according to the degree of abnormality detected in the current analysis result (analysis result according to the schedule information) to the administrator dialogue unit 14 based on various information displayed on this display screen 14C.

Moreover, a system administrator can input an order indicating that the alternative of an analysis result, not the current analysis result, is adopted as the regular analysis result of performance information to the administrator dialogue unit 14 (FIG. 18, the operation button 14Cd).

In addition, when the alternative of an analysis result is adopted as an analysis result, the administrator dialogue unit 14 corrects the content of the current schedule information stored in the analysis schedule accumulation unit 19 based on the content of the conforming model (the correlation model corresponding to an analytical period for which the alternative has been presented is replaced with the conforming model). As a result, accuracy of analysis result after that can be improved.

The other functions in each of the units are identical with the second exemplary embodiment mentioned above.

[Operation of the Third Exemplary Embodiment]

Next, hereinafter, operations of the system operations management apparatus 3 in the third exemplary embodiment of the present invention will be described based on FIG. 19 centering on portions different from the first and second exemplary embodiments mentioned above.

Figure 19:
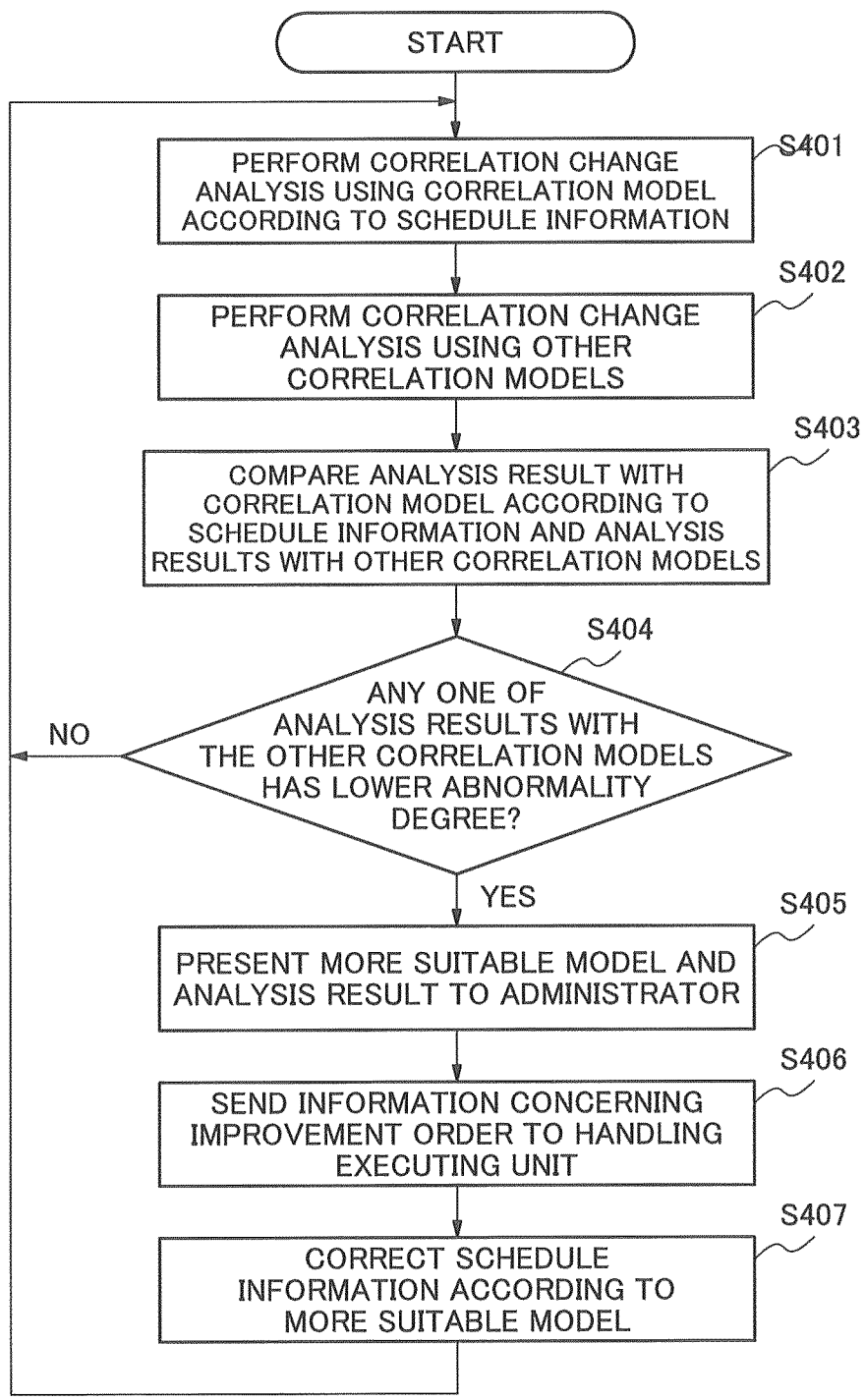
FIG. 19 A flow chart showing an operation by a conforming model determination unit 23 in the third exemplary embodiment of the present invention.

FIG. 19 is a flow chart showing the operations by the conforming model determination unit 23 in the third exemplary embodiment of the present invention.

Each step for generating schedule information among the operations of the system operations management apparatus 3 in the third exemplary embodiment of the present invention is the same as the second exemplary embodiment.

In the correlation change analysis step following that, the correlation change analysis unit 18 obtains performance information for analyses from the performance information collection unit 11 and also obtains all correlation models corresponding to a period set in advance among accumulated correlation models from the analytical model accumulation unit 17.

Then, the correlation change analysis unit 18 performs correlation change analysis of the performance information using the correlation model assigned according to schedule information (Step S401, the original model analysis step).

Next, the correlation change analysis unit 18 also performs correlation change analysis of the performance information using the other correlation models acquired from the analytical model accumulation unit 17 (Step S402, the other model analysis step).

Then, the correlation change analysis unit 18 sends all of an analysis result according to the schedule information and analysis results using the other correlation models to the conforming model determination unit 23.

Next, the conforming model determination unit 23 compares the analysis result according to the schedule information and the analysis results using the other correlation models (Step S403, the conforming model determination step).

As a result, when one of the analysis results using the other correlation models is superior to (has a lower degree of abnormality than) the analysis result according to the schedule information (Step S404/yes), the conforming model determination unit 23 sets the analysis result using the other correlation model for the alternative to the analysis result according to the schedule information. Then, the conforming model determination unit 23 sets the other correlation model of this alternative to the analysis result for the conforming model, and sends the analysis result according to the schedule information and the alternative to the analysis result to the failure analysis unit 13.

On the other hand, when analysis results using the other correlation models are not superior to the analysis result according to the schedule information (Step S404/no), the conforming model determination unit 23 sends only the analysis result according to the schedule information to the failure analysis unit 13.

Next, the failure analysis unit 13 receives the analysis result according to schedule information and the alternative from the conforming model determination unit 23, and, after performing failure analysis, sends the analysis result according to the schedule information of which the failure analysis has been done and the alternative to the administrator dialogue unit 14.

Next, the administrator dialogue unit 14 displays the content of the analysis result according to the schedule information and the alternative received from the failure analysis unit 13 (Step S405, the alternative output step).

Then, the administrator dialogue unit 14 accepts an input concerning a handling instruction by a system administrator or the like who has browsed the above-mentioned displayed content, and sends information on the input to the handling executing unit 15 (Step S406).

Moreover, when an input indicating that the alternative of the analysis result is used as the regular schedule information is received, the administrator dialogue unit 14 corrects the current schedule information stored in the analysis schedule accumulation unit 19 based on the content of the conforming model (replaces the correlation model corresponding to an analytical period for which the alternative has been presented with the conforming model) (Step S407, the schedule information correction step).

After this, the steps from Step S401 are carried out repeatedly.

Here, the concrete content that is carried out in each step mentioned above may be programmed to be executed by a computer.

[The Effect of the Third Exemplary Embodiment]

According to the third exemplary embodiment of the present invention, even when the operation pattern of the service-for-customers execution system 4 changes over time (that is, a case in which the service-for-customers execution system 4 is not necessarily operated in a manner set by schedule information), the system operations management apparatus 3 can carry out correlation change analysis with a high degree of accuracy. The reason is that the system operations management apparatus 3 outputs a correlation change analysis result made by using another correlation model which is not assigned in the schedule information, and, even if there occurs temporary disorder of the operation pattern, a correlation change analysis result using a correlation model corresponding to the time of the operation pattern disorder can be applied as an alternative to an analysis result.

For example, according to the third embodiment, even when business to be performed on the last day of a month usually is moved up by any reasons, an alternative to an analysis result such as "If regarding as the last day of the month, it is normal." can be presented with the analysis result according to schedule information. Thus, when there occurs a sudden difference in the operation pattern of the service-for-customers execution system 4, the system operations management apparatus 3 can show an appropriate analysis result to a system administrator.

Moreover, according to the third exemplary embodiment of the present invention, the content of schedule information can always be updated to the latest state, and thus an operations management environment in which various system errors can be handled flexibly can be obtained because the system operations management apparatus 3 can correct the content of schedule information stored in the analysis schedule accumulation unit 19 sequentially based on the content of a conforming model.

Although the present invention has been described in each above-mentioned exemplary embodiment above, the present invention is not limited to each above-mentioned exemplary embodiment.

This application is based upon and claims the benefit of priority from Japanese Patent Application No. 2009-238747, filed on Oct. 15, 2009, the disclosure of which is incorporated herein in its entirety by reference.

INDUSTRIAL APPLICABILITY

A system operations management apparatus, a system operations management method and a program storage medium according to the present invention can be applied to an information processing apparatus which provides various information communications services such as a web service and a business service as mentioned above. Because performance deterioration of a system can be detected in this information processing apparatus, it is applicable not only to an internet mail-order apparatus and an internal information apparatus but also to various kinds of equipment for which a case of concentration of use by a large number of customers at a given time is assumed such as a seat reservation and issuance device for a railway and an airplane and automatic seat ticket purchase equipment for movie theaters.

REFERENCE SIGNS LIST

1, 2, 3 and 101 System operations management apparatus
4 Service-for-customers execution system
11 Performance information collection unit
12 Performance information accumulation unit
13 Failure analysis unit
14 Administrator dialogue unit
15 Handling executing unit
16 Correlation model generation unit
17 Analytical model accumulation unit
18 Correlation change analysis unit
19 Analysis schedule accumulation unit
20 Periodical-model accumulation unit
21 Candidate information generation unit
21*a* Common correlation determination unit
21*b* Static element change point extraction unit
21*c* Dynamic element similarity determination unit
21*d* Required model group extraction unit
22 Correction candidate generation unit
22*a* Calendar information accumulation unit
22*b* Calendar characteristics determination unit
22*c* Correction candidate generation unit
23 Conforming model determination unit
30 Model generation unit
31 Analysis unit

What is claimed is:

1. A system operations management apparatus comprising:
   a memory configured to store program instructions; and
   a processor configured to execute the program instructions to implement:
   an analytical model accumulation unit configured to store analytical models which evaluate anomalies of acquired data; and
   a model generator configured to associate, by determining periods to which an identical analytical model is applied and identifying a calendar attribute matching the periods, the calendar attribute with the analytical model.

2. The system operation management apparatus according to claim 1, wherein,
   the analytical model includes one or more correlations between different pieces of the acquired data.

3. The system operations management apparatus according to claim 2, wherein,
   the model generator configured to assign, to periods having a common correlation, any one of the analytical models being respectively generated for the periods having the common correlation.

4. The system operations management apparatus according to claim 1, wherein the processor is configured to execute the program instructions to further implement,
   an analyzer configured to detect anomalies of the acquired data by using the analytical model associated with the calendar attribute of the period for the acquired data.

5. A system operations management method comprising:
    storing analytical models which evaluate anomalies of acquired data; and
    associating, by determining periods to which an identical analytical model is applied and identifying a calendar attribute matching the periods, the calendar attribute with the analytical model.

6. The system operation management method according to claim 5, wherein,
    the analytical model includes one or more correlations between different pieces of the acquired data.

7. The system operations management method according to claim 6, wherein,
    when storing one or more statistical models, storing the analytical model generated for each of a plurality of periods, and
    when associating the calendar attribute with the analytical model, assigning, to periods having a common correlation, any one of the analytical models being respectively generated for the periods having the common correlation.

8. The system operations management method according to claim 5, further comprising,
    detecting anomalies of the acquired data by using the analytical model associated with the calendar attribute of the period for the acquired data.

9. A non-transitory computer readable medium recording thereon a system operations management program, causing a computer to perform a method comprising:
    storing analytical models which evaluate anomalies of acquired data; and
    associating, by determining periods to which an identical analytical model is applied and identifying a calendar attribute matching the periods, the calendar attribute with the analytical model.

10. The non-transitory computer readable medium according to claim 9, recording thereon the system operations management program, causing a computer to perform the method, wherein,
    the analytical model includes one or more correlations between different pieces of the acquired data.

11. The non-transitory computer readable medium according to claim 10, recording thereon the system operations management program, causing a computer to perform the method, wherein,
    when storing one or more statistical models, storing the analytical model generated for each of a plurality of periods, and
    when associating the calendar attribute with the analytical model, assigning, to periods having a common correlation, any one of the analytical models being respectively generated for the periods having the common correlation.

12. The non-transitory computer readable medium according to claim 9, recording thereon the system operations management program, causing a computer to perform the method further comprising,
    detecting anomalies of the acquired data by using the analytical model associated with the calendar attribute of the period for the acquired data.

* * * * *